US008875199B2

(12) United States Patent
Rodriguez et al.

(10) Patent No.: US 8,875,199 B2
(45) Date of Patent: Oct. 28, 2014

(54) INDICATING PICTURE USEFULNESS FOR PLAYBACK OPTIMIZATION

(75) Inventors: Arturo A. Rodriguez, Norcross, GA (US); Jeffrey C. Hopper, Atlanta, GA (US)

(73) Assignee: Cisco Technology, Inc., San Jose, CA (US)

( * ) Notice: Subject to any disclaimer, the term of this patent is extended or adjusted under 35 U.S.C. 154(b) by 1201 days.

(21) Appl. No.: 11/831,916

(22) Filed: Jul. 31, 2007

(65) Prior Publication Data

US 2008/0115176 A1 May 15, 2008

Related U.S. Application Data

(60) Provisional application No. 60/865,644, filed on Nov. 13, 2006.

(51) Int. Cl.
*H04N 7/173* (2011.01)
*H04N 7/12* (2006.01)
*H04N 11/02* (2006.01)
*H04N 11/04* (2006.01)
*H04N 21/44* (2011.01)
*H04N 21/234* (2011.01)
*H04N 21/432* (2011.01)
*H04N 21/4402* (2011.01)

(52) U.S. Cl.
CPC . *H04N 21/440281* (2013.01); *H04N 21/44016* (2013.01); *H04N 21/23406* (2013.01); *H04N 21/4325* (2013.01); *H04N 21/44008* (2013.01); *H04N 21/23424* (2013.01); *H04N 21/44004* (2013.01)
USPC ............ 725/89; 725/88; 725/90; 375/240.25; 375/240.26

(58) Field of Classification Search
None
See application file for complete search history.

(56) References Cited

U.S. PATENT DOCUMENTS 4,764,805 A  8/1988 Rabbani et al.
5,440,345 A * 8/1995 Shimoda .................. 375/240.14

(Continued)

FOREIGN PATENT DOCUMENTS

EP  0 812 112 A2  12/1997
EP  1 292 138 A2  3/2003

(Continued)

OTHER PUBLICATIONS

Hurst et al., "MPEG Splicing Tutorial and Proposed SMPTE Standard", Proceedings of the SMPTE Technical Conference, Nov. 1997, pp. 105-117.*

(Continued)

*Primary Examiner* — Nasser Goodarzi
*Assistant Examiner* — Fred Peng
(74) *Attorney, Agent, or Firm* — Merchant & Gould

(57) ABSTRACT

In one embodiment the invention provides a method for outputting auxiliary information for use in playing back a video sequence, the method comprising obtaining a measure of usefulness of a particular picture for playing back the video sequence, wherein the measure of usefulness indicates a performance of playing back the video sequence if the particular picture is available in a decoded state at a time of playback versus the particular picture not being available in a decoded state at a time of playback; determining a position in a data stream that includes the video sequence; and storing the auxiliary information at the determined position in the data stream.

39 Claims, 5 Drawing Sheets

(56) References Cited

U.S. PATENT DOCUMENTS

| | | | |
|---|---|---|---|
| 5,606,359 A | 2/1997 | Youden et al. | |
| 5,734,443 A | 3/1998 | O'Grady | |
| 5,734,783 A * | 3/1998 | Shimoda et al. | 386/314 |
| 5,828,370 A | 10/1998 | Moeller et al. | |
| 5,854,873 A | 12/1998 | Mori et al. | |
| 5,917,830 A * | 6/1999 | Chen et al. | 370/487 |
| 5,917,988 A | 6/1999 | Eto | |
| 5,943,447 A | 8/1999 | Tkhor et al. | |
| 5,949,948 A * | 9/1999 | Krause et al. | 386/350 |
| 5,963,260 A * | 10/1999 | Bakhmutsky | 375/240.24 |
| 5,970,028 A | 10/1999 | Shimabukuro | |
| 6,144,375 A | 11/2000 | Jain et al. | |
| 6,160,889 A | 12/2000 | Yagasaki | |
| 6,188,436 B1 | 2/2001 | Williams et al. | |
| 6,201,927 B1 | 3/2001 | Commer | |
| 6,222,979 B1 | 4/2001 | Willis et al. | |
| 6,263,022 B1 | 7/2001 | Chen et al. | |
| 6,304,714 B1 * | 10/2001 | Krause et al. | 386/52 |
| 6,310,915 B1 | 10/2001 | Wells et al. | |
| 6,393,057 B1 | 5/2002 | Thoreau et al. | |
| 6,411,725 B1 | 6/2002 | Rhoads | |
| 6,421,387 B1 | 7/2002 | Rhee | |
| 6,512,552 B1 * | 1/2003 | Subramanian | 348/564 |
| 6,587,506 B1 | 7/2003 | Noridomi et al. | |
| 6,594,798 B1 | 7/2003 | Chou et al. | |
| 6,643,327 B1 | 11/2003 | Wang | |
| 6,658,199 B1 | 12/2003 | Hallberg | |
| 6,754,373 B1 | 6/2004 | de Cuetos et al. | |
| 6,806,909 B1 * | 10/2004 | Radha et al. | 348/384.1 |
| 6,906,743 B1 | 6/2005 | Maurer | |
| 6,907,075 B2 | 6/2005 | Felts et al. | |
| 6,909,743 B1 * | 6/2005 | Ward et al. | 375/240.01 |
| 6,912,251 B1 * | 6/2005 | Ward et al. | 375/240 |
| 6,980,594 B2 | 12/2005 | Wang et al. | |
| 7,027,713 B1 | 4/2006 | Hallberg | |
| 7,050,603 B2 * | 5/2006 | Rhoads et al. | 382/100 |
| 7,053,874 B2 * | 5/2006 | Koyama | 345/82 |
| 7,085,322 B2 | 8/2006 | Ngai et al. | |
| 7,085,381 B2 | 8/2006 | Kubota et al. | |
| 7,095,783 B1 | 8/2006 | Sotheran et al. | |
| 7,096,482 B2 | 8/2006 | Fujita et al. | |
| 7,113,523 B1 | 9/2006 | Kubota et al. | |
| 7,129,962 B1 | 10/2006 | Cote et al. | |
| 7,185,018 B2 | 2/2007 | Archbold | |
| 7,225,319 B2 | 5/2007 | Toma et al. | |
| 7,236,520 B2 | 6/2007 | Kim et al. | |
| 7,239,801 B2 | 7/2007 | Himeno et al. | |
| 7,243,193 B2 | 7/2007 | Walmsley | |
| 7,317,839 B2 | 1/2008 | Holcomb | |
| 7,376,335 B2 | 5/2008 | De Haan | |
| 7,397,858 B2 | 7/2008 | Garrido et al. | |
| 7,467,297 B2 | 12/2008 | Ji et al. | |
| 7,480,335 B2 | 1/2009 | Payson | |
| 7,577,198 B2 | 8/2009 | Holcomb | |
| 7,584,495 B2 | 9/2009 | Hannuksela et al. | |
| 7,586,924 B2 | 9/2009 | Wiegand | |
| 7,590,180 B2 | 9/2009 | Kang | |
| 7,599,435 B2 | 10/2009 | Marpe et al. | |
| 7,599,438 B2 | 10/2009 | Holcomb | |
| 7,606,308 B2 | 10/2009 | Holcomb | |
| 7,616,692 B2 | 11/2009 | Holcomb | |
| 7,620,106 B2 | 11/2009 | Holcomb | |
| 7,623,574 B2 | 11/2009 | Holcomb | |
| 7,649,937 B2 | 1/2010 | Rabenold et al. | |
| 7,656,410 B2 | 2/2010 | Chiu | |
| 7,720,145 B2 | 5/2010 | Muthukrishnan et al. | |
| 7,733,910 B2 | 6/2010 | Mace et al. | |
| 7,733,956 B1 | 6/2010 | Kalra et al. | |
| 7,809,059 B2 | 10/2010 | Yin et al. | |
| 7,809,060 B2 | 10/2010 | Toma et al. | |
| 7,889,788 B2 | 2/2011 | Toma et al. | |
| 7,903,743 B2 | 3/2011 | Ho | |
| 8,102,406 B2 | 1/2012 | Peleg et al. | |
| 8,136,140 B2 | 3/2012 | Hodge | |
| 8,155,207 B2 | 4/2012 | Rodriguez et al. | |
| 8,254,446 B2 | 8/2012 | Toma et al. | |
| 8,259,814 B2 | 9/2012 | Rodriguez et al. | |
| 8,259,817 B2 | 9/2012 | Rodriguez et al. | |
| 8,265,154 B2 | 9/2012 | Gardner | |
| 8,279,926 B2 | 10/2012 | Rodriguez et al. | |
| 8,320,465 B2 | 11/2012 | Rodriguez et al. | |
| 8,326,131 B2 | 12/2012 | Rodriguez | |
| 2002/0071485 A1 | 6/2002 | Caglar et al. | |
| 2002/0075402 A1 | 6/2002 | Robson et al. | |
| 2002/0092017 A1 | 7/2002 | Klosterman et al. | |
| 2002/0133819 A1 | 9/2002 | Jackson | |
| 2002/0149591 A1 * | 10/2002 | Van Der Vleuten et al. | 345/530 |
| 2002/0162111 A1 | 10/2002 | Shimizu et al. | |
| 2002/0176025 A1 | 11/2002 | Kim | |
| 2002/0178444 A1 | 11/2002 | Trajkovic et al. | |
| 2003/0012554 A1 | 1/2003 | Zeidler et al. | |
| 2003/0016876 A1 | 1/2003 | Chai et al. | |
| 2003/0043847 A1 * | 3/2003 | Haddad | 370/473 |
| 2003/0067479 A1 | 4/2003 | Jung et al. | |
| 2003/0072555 A1 * | 4/2003 | Yap et al. | 386/40 |
| 2003/0081934 A1 | 5/2003 | Kirmuss | |
| 2003/0093800 A1 | 5/2003 | Demas et al. | |
| 2003/0113098 A1 | 6/2003 | Willis | |
| 2003/0123849 A1 | 7/2003 | Nallur | |
| 2003/0161407 A1 | 8/2003 | Murdock et al. | |
| 2003/0189982 A1 | 10/2003 | MacInnis | |
| 2003/0195977 A1 | 10/2003 | Liu et al. | |
| 2004/0010807 A1 | 1/2004 | Urdang et al. | |
| 2004/0012510 A1 | 1/2004 | Chen | |
| 2004/0028227 A1 | 2/2004 | Yu | |
| 2004/0040035 A1 | 2/2004 | Carlucci et al. | |
| 2004/0078186 A1 | 4/2004 | Nair | |
| 2004/0128578 A1 | 7/2004 | Jonnalagadda | |
| 2004/0133908 A1 | 7/2004 | Smith et al. | |
| 2004/0139462 A1 | 7/2004 | Hannuksela et al. | |
| 2004/0177369 A1 | 9/2004 | Akins | |
| 2004/0179619 A1 * | 9/2004 | Tian et al. | 375/240.26 |
| 2004/0210925 A1 | 10/2004 | Miyazawa et al. | |
| 2004/0218816 A1 * | 11/2004 | Hannuksela | 382/232 |
| 2004/0230994 A1 | 11/2004 | Urdang et al. | |
| 2004/0257472 A1 | 12/2004 | Mpr et al. | |
| 2005/0002574 A1 | 1/2005 | Fukuhara et al. | |
| 2005/0013249 A1 | 1/2005 | Kong et al. | |
| 2005/0022245 A1 | 1/2005 | Nallur et al. | |
| 2005/0053144 A1 | 3/2005 | Holcomb | |
| 2005/0053155 A1 | 3/2005 | Holcomb | |
| 2005/0069212 A1 | 3/2005 | Bottreau et al. | |
| 2005/0084166 A1 | 4/2005 | Boneh et al. | |
| 2005/0123056 A1 | 6/2005 | Wang | |
| 2005/0175098 A1 | 8/2005 | Narasimhan et al. | |
| 2005/0190774 A1 * | 9/2005 | Wiegand | 370/395.64 |
| 2005/0207733 A1 * | 9/2005 | Gargi | 386/68 |
| 2005/0226323 A1 | 10/2005 | Secker | |
| 2005/0226325 A1 | 10/2005 | Dei et al. | |
| 2005/0226327 A1 | 10/2005 | Kim | |
| 2005/0229225 A1 | 10/2005 | Klausberger et al. | |
| 2005/0254498 A1 | 11/2005 | Itoh | |
| 2005/0281329 A1 | 12/2005 | Chin | |
| 2006/0013305 A1 | 1/2006 | Sun | |
| 2006/0036551 A1 | 2/2006 | Oliveira et al. | |
| 2006/0072597 A1 | 4/2006 | Hannuksela | |
| 2006/0083298 A1 | 4/2006 | Wang | |
| 2006/0083311 A1 | 4/2006 | Winger | |
| 2006/0093045 A1 | 5/2006 | Anderson et al. | |
| 2006/0093315 A1 | 5/2006 | Kelly et al. | |
| 2006/0109856 A1 | 5/2006 | Deshpande | |
| 2006/0117357 A1 | 6/2006 | Surline | |
| 2006/0120463 A1 | 6/2006 | Wang | |
| 2006/0126728 A1 | 6/2006 | Yu et al. | |
| 2006/0129914 A1 | 6/2006 | Ellis | |
| 2006/0133645 A1 | 6/2006 | Rhoads et al. | |
| 2006/0147121 A1 * | 7/2006 | Maeda et al. | 382/233 |
| 2006/0170571 A1 | 8/2006 | Martinian et al. | |
| 2006/0188169 A1 | 8/2006 | Tener et al. | |
| 2006/0222319 A1 | 10/2006 | Russ | |
| 2006/0224763 A1 | 10/2006 | Altunbasak et al. | |
| 2006/0262861 A1 | 11/2006 | Kobayashi | |
| 2006/0277566 A1 | 12/2006 | Vince et al. | |
| 2006/0282319 A1 | 12/2006 | Maggio | |

(56) References Cited

U.S. PATENT DOCUMENTS

| | | |
|---|---|---|
| 2006/0294171 A1 | 12/2006 | Bossen |
| 2007/0011447 A1 | 1/2007 | Murray et al. |
| 2007/0019724 A1 | 1/2007 | Tourapis |
| 2007/0030186 A1 | 2/2007 | Archbold |
| 2007/0030356 A1 | 2/2007 | Yea |
| 2007/0030818 A1 | 2/2007 | Bahnck et al. |
| 2007/0031110 A1 | 2/2007 | Rijckaert |
| 2007/0038921 A1 | 2/2007 | Pekonen et al. |
| 2007/0053665 A1 | 3/2007 | Kato |
| 2007/0081586 A1 | 4/2007 | Raveendran et al. |
| 2007/0091997 A1 | 4/2007 | Fogg et al. |
| 2007/0109409 A1 | 5/2007 | Yea |
| 2007/0112721 A1 | 5/2007 | Archbold |
| 2007/0116277 A1 | 5/2007 | Ro et al. |
| 2007/0116426 A1 | 5/2007 | Toma et al. |
| 2007/0121721 A1 | 5/2007 | Kim et al. |
| 2007/0133674 A1 | 6/2007 | Garnier et al. |
| 2007/0140358 A1 | 6/2007 | Schwartz et al. |
| 2007/0147686 A1 | 6/2007 | Joshi |
| 2007/0153679 A1 | 7/2007 | Jost et al. |
| 2007/0153916 A1 | 7/2007 | Demircin et al. |
| 2007/0172133 A1 | 7/2007 | Kim |
| 2007/0183494 A1 | 8/2007 | Hannuksela |
| 2007/0186240 A1 | 8/2007 | Ward et al. |
| 2007/0194975 A1 | 8/2007 | Jang et al. |
| 2007/0223595 A1* | 9/2007 | Hannuksela et al. .... 375/240.26 |
| 2007/0230460 A1 | 10/2007 | Jeong et al. |
| 2007/0230496 A1 | 10/2007 | Guo et al. |
| 2007/0245382 A1 | 10/2007 | Doi et al. |
| 2007/0280350 A1 | 12/2007 | Mathew et al. |
| 2007/0297460 A1 | 12/2007 | Muneishi et al. |
| 2008/0022340 A1 | 1/2008 | Hannuksela et al. |
| 2008/0025399 A1 | 1/2008 | Le Leannec et al. |
| 2008/0037658 A1 | 2/2008 | Price et al. |
| 2008/0037957 A1 | 2/2008 | Nallur et al. |
| 2008/0055463 A1 | 3/2008 | Lerner |
| 2008/0056383 A1 | 3/2008 | Ueki et al. |
| 2008/0063074 A1 | 3/2008 | Gallant et al. |
| 2008/0089422 A1 | 4/2008 | Karczewicz |
| 2008/0115175 A1 | 5/2008 | Rodriguez |
| 2008/0117985 A1 | 5/2008 | Chen |
| 2008/0127255 A1 | 5/2008 | Ress et al. |
| 2008/0131079 A1 | 6/2008 | Toma |
| 2008/0137728 A1 | 6/2008 | Van Der Stok et al. |
| 2008/0137742 A1 | 6/2008 | Chen |
| 2008/0141091 A1 | 6/2008 | Kalluri |
| 2008/0151101 A1 | 6/2008 | Tian et al. |
| 2008/0152005 A1 | 6/2008 | Oguz et al. |
| 2008/0152006 A1 | 6/2008 | Chen et al. |
| 2008/0163308 A1 | 7/2008 | Kim |
| 2008/0192817 A1 | 8/2008 | Llach et al. |
| 2008/0219393 A1 | 9/2008 | Toma et al. |
| 2008/0225850 A1 | 9/2008 | Oran et al. |
| 2008/0225951 A1 | 9/2008 | Young |
| 2008/0244658 A1 | 10/2008 | Chen |
| 2008/0247463 A1 | 10/2008 | Buttimer |
| 2008/0256409 A1 | 10/2008 | Oran et al. |
| 2008/0260045 A1 | 10/2008 | Rodriguez et al. |
| 2008/0273596 A1 | 11/2008 | Oguz et al. |
| 2008/0311869 A1 | 12/2008 | Koga et al. |
| 2008/0320558 A1 | 12/2008 | Imanishi et al. |
| 2009/0002379 A1 | 1/2009 | Baeza |
| 2009/0003439 A1 | 1/2009 | Wang et al. |
| 2009/0003446 A1 | 1/2009 | Wu |
| 2009/0003447 A1 | 1/2009 | Christoffersen |
| 2009/0016203 A1 | 1/2009 | Yahata et al. |
| 2009/0028247 A1 | 1/2009 | Suh |
| 2009/0034627 A1 | 2/2009 | Rodriguez et al. |
| 2009/0034633 A1 | 2/2009 | Rodriguez et al. |
| 2009/0041130 A1 | 2/2009 | Yoon et al. |
| 2009/0073928 A1 | 3/2009 | Power |
| 2009/0097568 A1 | 4/2009 | Karczewicz et al. |
| 2009/0100482 A1 | 4/2009 | Rodriguez et al. |
| 2009/0103635 A1 | 4/2009 | Pahalawatta |
| 2009/0109342 A1 | 4/2009 | Heng et al. |
| 2009/0116558 A1 | 5/2009 | Chen |
| 2009/0138668 A1 | 5/2009 | Blankenship |
| 2009/0141168 A1 | 6/2009 | Chen et al. |
| 2009/0147859 A1 | 6/2009 | McGowan et al. |
| 2009/0148056 A1 | 6/2009 | Rodriguez et al. |
| 2009/0148132 A1 | 6/2009 | Rodriguez et al. |
| 2009/0154560 A1 | 6/2009 | Hong |
| 2009/0154563 A1 | 6/2009 | Hong |
| 2009/0161770 A1 | 6/2009 | Dong |
| 2009/0180546 A1 | 7/2009 | Rodriguez et al. |
| 2009/0180547 A1 | 7/2009 | Rodriguez et al. |
| 2009/0190655 A1 | 7/2009 | Shimada |
| 2009/0190849 A1 | 7/2009 | Huang |
| 2009/0199231 A1 | 8/2009 | Tsuria et al. |
| 2009/0207904 A1 | 8/2009 | Pandit et al. |
| 2009/0210412 A1 | 8/2009 | Oliver |
| 2009/0214178 A1* | 8/2009 | Takahashi ...................... 386/84 |
| 2009/0220012 A1 | 9/2009 | Rodriguez et al. |
| 2009/0226105 A1 | 9/2009 | Huang |
| 2009/0262804 A1 | 10/2009 | Pandit |
| 2009/0279608 A1 | 11/2009 | Jeon |
| 2009/0296811 A1 | 12/2009 | Jeon |
| 2009/0310934 A1 | 12/2009 | Rodriguez |
| 2009/0313662 A1 | 12/2009 | Rodriguez |
| 2009/0313668 A1 | 12/2009 | Shepherd |
| 2009/0323822 A1 | 12/2009 | Rodriguez |
| 2010/0003015 A1 | 1/2010 | Rodriguez |
| 2010/0020870 A1 | 1/2010 | Jeon |
| 2010/0026882 A1 | 2/2010 | Jeon |
| 2010/0026883 A1 | 2/2010 | Jeon |
| 2010/0026884 A1 | 2/2010 | Jeon |
| 2010/0027417 A1 | 2/2010 | Franceschini et al. |
| 2010/0027653 A1 | 2/2010 | Jeon |
| 2010/0027654 A1 | 2/2010 | Jeon |
| 2010/0027659 A1 | 2/2010 | Jeon |
| 2010/0027660 A1 | 2/2010 | Jeon |
| 2010/0027667 A1 | 2/2010 | Samuelsson et al. |
| 2010/0027682 A1 | 2/2010 | Jeon |
| 2010/0074340 A1 | 3/2010 | Luo et al. |
| 2010/0118973 A1 | 5/2010 | Rodriguez et al. |
| 2010/0118974 A1 | 5/2010 | Rodriguez et al. |
| 2010/0118978 A1 | 5/2010 | Rodriguez et al. |
| 2010/0118979 A1 | 5/2010 | Rodriguez et al. |
| 2010/0122311 A1 | 5/2010 | Rodriguez et al. |
| 2010/0150232 A1 | 6/2010 | Nguyen et al. |
| 2010/0150234 A1 | 6/2010 | Koo et al. |
| 2010/0150527 A1 | 6/2010 | Sandoval |
| 2010/0195721 A1 | 8/2010 | Wu et al. |
| 2010/0215338 A1 | 8/2010 | Rodriguez |
| 2010/0218232 A1 | 8/2010 | Rodriguez |
| 2010/0241753 A1 | 9/2010 | Garbajs et al. |
| 2010/0292820 A1 | 11/2010 | Yahata et al. |
| 2010/0293571 A1 | 11/2010 | Rodriguez |
| 2010/0322302 A1 | 12/2010 | Rodriguez |
| 2011/0222837 A1 | 9/2011 | Walton et al. |
| 2012/0263228 A1 | 10/2012 | Rodriguez et al. |
| 2013/0028314 A1 | 1/2013 | Rodriguez et al. |

FOREIGN PATENT DOCUMENTS

| | | |
|---|---|---|
| EP | 1 328 119 A1 | 7/2003 |
| EP | 1 480 460 A1 | 11/2004 |
| JP | 05-236465 A | 9/1993 |
| KR | 10-2004-0054708 A | 6/2004 |
| WO | WO 00/00981 A2 | 1/2000 |
| WO | WO 00/62552 A2 | 10/2000 |
| WO | WO 01/01702 | 1/2001 |
| WO | 01/43440 | 6/2001 |
| WO | 01/63774 | 8/2001 |
| WO | WO 2004/102571 A1 | 11/2004 |
| WO | WO 2005/106875 A1 | 11/2005 |
| WO | WO 2006/083824 A2 | 8/2006 |
| WO | 2006/101979 | 9/2006 |
| WO | WO 2006/114761 A1 | 11/2006 |
| WO | WO 2008/063881 A2 | 5/2008 |

(56) References Cited

FOREIGN PATENT DOCUMENTS

| | | |
|---|---|---|
| WO | WO 2009/018360 A1 | 2/2009 |
| WO | WO 2009/052262 A2 | 4/2009 |

OTHER PUBLICATIONS

Hurst MPEG splicing.pdf, Hurst et al., "MPEG Splicing Tutorial and Proposed SMPTE Standard", Proceedings of the SMPTE Technical Conference, Nov. 1997, pp. 105-117.*
International Search Report and Written Opinion issued in International Application No. PCT/US2007/083867 mailed May 23, 2008.
MacInnis, A. et al., "NAL for AVC Video with MPEG-2 Systems," Video Standards and Drafts, pp. 1-11 (Mar. 2002).
Tian et al., "Sub-Sequence Video Coding for Improved Temporal Scalability", 4 pages.
Written Opinion dated Sep. 4, 2009 cited in International Application No. PCT/US2009/044370.
U.S. Appl. No. 12/709,851 filed Feb. 22, 2010 entitled "Signalling of Decodable Sub-Sequences", Inventor: Arturo A. Rodriguez.
U.S. Appl. No. 12/713,153, filed Feb. 25, 2010 entitled "Signalling of Auxiliary Information that Assists Processing of Video According to Various Formats", Inventors: Rodriguez et al.
U.S. Appl. No. 12/722,117, filed Mar. 11, 2010 entitled "Management of Picture Referencing in Video Streams for Plural Playback Modes", Inventors: Walton et al.
International Preliminary Report on Patentability and Written Opinion dated Feb. 2, 2010 cited in International Application No. PCT/US2008/071111.
International Search Report and Written Opinion dated Apr. 15, 2010 cited in International Application No. PCT/US2010/024927.
European Examination dated May 4, 2010 in Application No. 07 844 937.8.
Stuhlmuller, Klaus, et al., "Analysis of Video Transmission over Lossy Channels"; IEEE Journal on Selected Areas in Communication, vol. 18, No. 6, Jun. 2000, pp. 1012-1032.
PCT Search Report cited in International Appln No. PCT/US2009/064180 mailed Jan. 8, 2010.
PCT Written Opinion cited in Internatnional Appln No. PCT/US2009/064180 mailed Jan. 8, 2010.
PCT Search Report cited in International Appln No. PCT/US2009/047521 mailed Dec. 22, 2009.
PCT Written Opinion cited in Internatnional Appln No. PCT/US2009/047521 mailed Dec. 22, 2009.
European Examination dated Sep. 16, 2010 in Application No. 08 796 875.6.
U.S. Non-Final Office Action in U.S. Appl. No. 11/627,452 dated Nov. 10, 2010.
U.S. Appl. No. 12/779,035, filed May 12, 2010 entitled "Signalling Buffer Characteristics for Splicing Operations of Video Streams", Inventors: Rodriguez et al.
U.S. Final Office Action in U.S. Appl. No. 11/627,452 dated Mar. 4, 2011.
U.S. Non-Final Office Action in U.S. Appl. No. 12/417,869 dated Apr. 4, 2011.
U.S. Appl. No. 12/417,864, filed Apr. 3, 2009, entitled "System and Method for Authorization of Segment Boundary Notifications."
U.S. Appl. No. 12/492,117, filed Jun. 25, 2009, entitled "Support for Blocking Trick Mode Operations."
U.S. Appl. No. 12/483,925, filed Jun. 12, 2009, entitled "Picture Interdependencies Signals in Context of MMCO to Assist Stream Manipulation."
U.S. Appl. No. 12/417,868, filed Apr. 3, 2009, entitled "Segment Boundary Notification to a Digital Media Receiver."
U.S. Appl. No. 12/417,869, filed Apr. 3, 2009 entitled "System and Method for Processing Segment Boundary Notifications."
ITU-T Telecommunication Standardization Sector of ITU, Infrastructure of Audiovisual Services—Coding of Moving Video, "Advanced Video Coding for Generic Audiovisual Services", International Telecommunication Union, H.264, May 2003, XP008095420, 282 pages.
Gruneberg et al., International Organisation for Standardisation Organisation Internationale de Normalisation ISO/IEC JTC1/SC29/WG11 Coding of Moving Pictures and Audio, "Proposal for MPEG-2 Transport Stream Extensions for Scalable Video Coding", XP030043296, Jul. 2007, 6 pages.
Amon et al., "File Format for Scalable Video Coding", IEEE Transactions on Circuits and Systems for Video Technology, vol. 17 No. 9, Sep. 2007, pp. 1174-1185.
ITU: "Series H: Audiovisual and Multimedia Systems: Infrastructure of Audiovisual Services—Transmission Multiplexing and Synchronization", Systems ITU-T Recommendation H.222.0, May 2006, http://mirror.itu.int/dms/pay/itu-t/rec/h/T-REC-H.222.0-200605.I_PDF_E.pdf, XP007905991, pp. 1-76.
"Splice Points for MPEG-2 Transport Streams", SMPTE Journal, SMPTE Inc., vol. 107 No. Oct. 1998, XP-000793004, pp. 916-925.
Rodriguez et al., "SEI message to convey suitable splice points in the bitstream", JVT Meeting, Document JVT-Z040, Filename JVT-Z040.doc, XP-30007329, Jan. 2008, pp. 1-8.
Luo et al., "On HRD conformance for splice bitstreams", JVT Meeting, Document JVT-V055r1, Filename JVT-V055r1.doc, XP-30006863, Jan. 2007, pp. 1-11.
International Search Report dated Sep. 4, 2009 cited in International Application No. PCT/US2009/047237.
Written Opinion dated Sep. 4, 2009 cited in International Application No. PCT/US2009/047237.
International Search Report dated Sep. 4, 2009 cited in International Application No. PCT/US2009/044370.
International Search Report and Written Opinion dated Oct. 30, 1998 cited in International Application No. PCT/US2008/071621.
International Search Report and Written Opinion dated Oct. 18, 2004 cited in International Application No. PCT/US2004/023279.
International Search Report and Written Opinion dated Apr. 15, 2009 cited in International Application No. PCT/US2008/080128.
U.S. Non-Final Office Action dated Dec. 28, 2007 in U.S. Appl. No. 10/623,683.
U.S. Final Office Action dated Jul. 25, 2008 in U.S. Appl. No. 10/623,683.
European Communication dated Aug. 9, 2011 in Application No. 08 838 787.3.
European Communication dated Dec. 14, 2011 in Application No. 09 751 294.1.
U.S. Non-Final Office Action in U.S. Appl. No. 12/417,864 dated Apr. 18, 2011.
U.S. Final Office Action mailed Jul. 5, 2011 in U.S. Appl. No. 12/417,864.
U.S. Non-Final Office Action mailed Aug. 5, 2011 in U.S. Appl. No. 11/831,906.
U.S. Final Office Action mailed Aug. 5, 2011 in U.S. Appl. No. 12/417,869.
U.S. Non-Final Office Action mailed Sep. 14, 2011 in U.S. Appl. No. 12/124,779.
U.S. Non-Final Office Action mailed Sep. 22, 2011 in U.S. Appl. No. 11/831,912.
U.S. Non-Final Office Action mailed Nov. 10, 2011 in U.S. Appl. No. 12/483,925.
U.S. Non-Final Office Action mailed Nov. 23, 2011 in U.S. Appl. No. 12/141,015.
U.S. Non-Final Office Action mailed Nov. 29, 2011 in U.S. Appl. No. 12/492,117.
U.S. Non-Final Office Action mailed Nov. 23, 2011 in U.S. Appl. No. 12/141,017.
U.S. Non-Final Office Action mailed Dec. 21, 2012 in U.S. Appl. No. 12/333,296.
U.S. Non-Final Office Action mailed Dec. 22, 2011 in U.S. Appl. No. 12/617,043.
U.S. Non-Final Office Action mailed Dec. 27, 2011 in U.S. Appl. No. 12/417,869.
U.S. Non-Final Office Action mailed Dec. 27, 2011 in U.S. Appl. No. 12/252,632.
U.S. Non-Final Office Action mailed Jan. 4, 2012 in U.S. Appl. No. 12/617,062.
U.S. Non-Final Office Action mailed Jan. 10, 2012 in U.S. Appl. No. 12/333,301.

(56) References Cited

OTHER PUBLICATIONS

European Communication dated Sep. 22, 2011 in Application No. 08796584.4, 9 pages.
Chinese First Office Action mailed Dec. 31, 2011 in Application No. 200880121233.X, 7 pages.
Canadian Office Action dated Jun. 6, 2012 in Application No. 2,669,552, 3 pages.
European Communication dated Jul. 5, 2012 in Application No. 08838787.3, 6 pages.
Supplementary European Search Report dated Jul. 17, 2012 in Application No. 09826735, 3 pages.
Supplementary European Search Report dated Jul. 26, 2012 in Application No. 09767598, 7 pages.
Chinese First Office Action mailed Aug. 31, 2012 in Application No. 200980118689.5, 12 pages.
Chinese First Office Action mailed Feb. 21, 2013 in Application No. 200980145072.2, 16 pages.
U.S. Non-Final Office Action mailed Jan. 18, 2012 in U.S. Appl. No. 12/617,015, 31 pages.
U.S. Final Office Action mailed Jan. 19, 2012 in U.S. Appl. No. 12/124,779, 12 pages.
U.S. Final Office Action mailed Feb. 17, 2012 in U.S. Appl. No. 11/627,452, 11 pages.
U.S. Non-Final Office Action mailed Mar. 8, 2012 in U.S. Appl. No. 12/351,776, 31 pages.
U.S. Final Office Action mailed Mar. 13, 2012 in U.S. Appl. No. 11/831,906, 24 pages.
U.S. Final Office Action mailed Mar. 19, 2012 in U.S. Appl. No. 11/831,912, 20 pages.
U.S. Non-Final Office Action mailed Mar. 26, 2012 in U.S. Appl. No. 12/395,676, 37 pages.
U.S. Non-Final Office Action mailed Apr. 23, 2012 in U.S. Appl. No. 12/709,851, 29 pages.
U.S. Non-Final Office Action mailed Apr. 25, 2012 in U.S. Appl. No. 12/141,019, 28 pages.
U.S. Final Office Action mailed May 11, 2012 in U.S. Appl. No. 12/141,015, 25 pages.
U.S. Final Office Action mailed May 18, 2012 in U.S. Appl. No. 12/492,117, 17 pages.
U.S. Non-Final Office Action mailed May 23, 2012 in U.S. Appl. No. 12/616,974, 30 pages.
U.S. Final Office Action mailed May 23, 2012 in U.S. Appl. No. 12/333,296, 21 pages.
U.S. Final Office Action mailed May 23, 2012 in U.S. Appl. No. 12/333,301, 18 pages.
U.S. Final Office Action mailed Jun. 11, 2012 in U.S. Appl. No. 12/141,017, 23 pages.
U.S. Final Office Action mailed Jun. 4, 2012 in U.S. Appl. No. 12/252,632, 22 pages.
U.S. Non-Final Office Action mailed Jun. 15, 2012 in U.S. Appl. No. 12/124,779, 12 pages.
U.S. Non-Final Office Action mailed Jun. 20, 2012 in U.S. Appl. No. 12/722,117, 30 pages.
U.S. Non-Final Office Action mailed Jun. 25, 2012 in U.S. Appl. No. 12/417,868, 37 pages.
U.S. Final Office Action mailed Jul. 6, 2012 in U.S. Appl. No. 12/617,043, 26 pages.
U.S. Non-Final Office Action mailed Jul. 10, 2012 in U.S. Appl. No. 12/417,869, 8 pages.
U.S. Final Office Action mailed Jul. 16, 2012 in U.S. Appl. No. 12/351,776, 6 pages.
U.S. Non-Final Office Action mailed Jul. 18, 2012 in U.S. Appl. No. 12/616,991, 25 pages.
U.S. Non-Final Office Action mailed Aug. 10, 2012 in U.S. Appl. No. 12/483,925, 35 pages.
U.S. Non-Final Office Action mailed Sep. 13, 2012 in U.S. Appl. No. 12/141,015, 22 pages.
U.S. Non-Final Office Action mailed Oct. 2, 2012 in U.S. Appl. No. 12/417,864, 17 pages.
U.S. Non-Final Office Action mailed Oct. 22, 2012 in U.S. Appl. No. 12/779,035, 33 pages.
U.S. Final Office Action mailed Nov. 23, 2012 in U.S. Appl. No. 12/417,869, 16 pages.
U.S. Final Office Action mailed Nov. 27, 2012 in U.S. Appl. No. 12/616,991, 34 pages.
U.S. Final Office Action mailed Dec. 19, 2012 in U.S. Appl. No. 12/722,117, 24 pages.
U.S. Final Office Action mailed Jan. 4, 2013 in U.S. Appl. No. 12/417,868, 19 pages.
U.S. Non-Final Office Action mailed Jan. 24, 2013 in U.S. Appl. No. 12/713,153, 41 pages.
U.S. Non-Final Office Action mailed Feb. 26, 2013 in U.S. Appl. No. 12/617,043, 31 pages.
U.S. Final Office Action mailed Feb. 26, 2013 in U.S. Appl. No. 12/141,019, 14 pages.
U.S. Final Office Action mailed Feb. 28, 2013 in U.S. Appl. No. 12/483,925, 37 pages.
U.S. Final Office Action mailed Mar. 18, 2013 in U.S. Appl. No. 12/141,015, 23 pages.
U.S. Final Office Action mailed Mar. 18, 2013 in U.S. Appl. No. 12/417,864, 13 pages.
U.S. Non-Final Office Action mailed Mar. 20, 2013 in U.S. Appl. No. 11/831,912, 17 pages.
U.S. Non-Final Office Action mailed Apr. 9, 2013 in U.S. Appl. No. 121/831,906, 22 pages.
U.S. Non-Final Office Action mailed Apr. 9, 2013 in U.S. Appl. No. 12/492,117, 20 pages.
U.S. Non-Final Office Action mailed Apr. 9, 2013 in U.S. Appl. No. 11/627,452, 11 pages.
D.T. Nguyen and J. Ostermann, "Congestion Control using Scalable Video Coding based on H. 264/AVC," IEEE Journal of Selected Topics in Signal Processing, vol. 1 No. 2, Aug. 2007, 8 pages.
Digital Video Image Quality and Perceptual Coding edited by H.R. Wu and K.R. Rao, CRC Press 2005, pp. 503-541.
Author Unknown, SMPTE Standard for Television—Splice Points for MPEG-2 Transport Streams, The Society of Motion Picture and Television Engineers, Copyright 1999, http://www.ietf.org/mail-archive/web/avtext/current/pdf6u0ckuE66s.pdf, accessed May 30, 2012, 20 pages.
Hannuksela et al., "H.264/AVC Video for Wireless Transmission," IEEE Wireless Communications, IEEE Service Center, Piscataway, NJ, US, vol. 12, No. 4, Aug. 1, 2005, pp. 6-13.
Psannis K. et al., "Efficient Flexible Macroblock Ordering Technique," IEICE Transactions on Communications, Communications Society, Tokyo JP, vol. E19B, No. 8, Aug. 1, 2008, pp. 2692-2701.
Tom A. S. et al., "Packet Video for Cell Loss Protection Using Deinterleaving and Scrambling," Speech Processing 1. Toronto, May 14-17, 1991; [International Conference on Acoustics, Speech & Signal Processing. ICASSP], New York, IEEE, US, vol. CONF. 16, Apr. 14, 1991, pp. 2857-2860.
Schwarz H. et al., "SVC Overview," 21. JVT Metting; 78. MPEG Meeting; Oct. 20-27, 2006; Hangzhou CN; (Joint Video Team of ISO/IEC JTC1/SC29/WG11 and ITU-T SG.16), No. JVT-U145, Oct. 20, 2006, 20 pages.
Yao Wang et al., "Error Control and Concealment for Video Communication: A Review," Proceedings of the IEEE, New York, vol. 86, No. 5, May 1, 1998, 24 pages.
U.S. Final Office Action mailed Jan. 2, 2014 in U.S. Appl. No. 12/483,925, 47 pages.
U.S. Final Office Action mailed Jan. 16, 2014 in U.S. Appl. No. 12/333,296, 18 pages.
U.S. Final Office Action mailed Jan. 27, 2014 in U.S. Appl. No. 12/492,117, 23, pages.
U.S. Non-Final Office Action mailed Jan. 29, 2014 in U.S. Appl. No. 12/252,632, 22 pages.
U.S. Final Office Action mailed Jan. 30, 2014 in U.S. Appl. No. 12/722,117, 22 pages.
U.S. Office Action mailed Feb. 10, 2014 in U.S. Appl. No. 12/713,153, 18 pages.
U.S. Office Action mailed Feb. 13, 2014 in U.S. Appl. No. 13/633,672, 5 pages.
U.S. Office Action mailed Mar. 21, 2014 in U.S. Appl. No. 11/831,906, 20 pages.
U.S. Office Action mailed Mar. 28, 2014 in U.S. Appl. No. 12/417,869, 12 pages.

\* cited by examiner

INDICATING PICTURE USEFULNESS FOR PLAYBACK OPTIMIZATION

CROSS REFERENCE TO RELATED APPLICATIONS

This application claims priority to U.S. provisional application, "SYSTEM AND METHOD FOR SIGNALING CHARACTERISTICS OF PICTURES' INTERDEPENDENCIES," Ser. No. 60/865,644, filed on Nov. 13, 2006, which is entirely incorporated herein by reference for all purposes. This application is related to the following co-pending U.S. patent applications each of which is incorporated by reference as if set forth in full in this document for all purposes:

(1) "Non-enhancing media redundancy coding for mitigating transmission impairments," Ser. No. 11/831,905, naming inventor Arturo Rodriguez, files Jul. 31, 2007; and (2) "Simultaneous processing of media and redundancy streams for mitigating impairments," Ser. No. 11/831,912, naming inventor Arturo Rodriguez, filed on Jul. 31, 2007.

TECHNICAL FIELD

Particular embodiments are generally related to processing video streams in network systems.

BACKGROUND

The implementation of digital video with an advanced video compression method is expected to extend the same level of usability and functionality that established compression methods extend to applications and network systems. Video processing devices throughout the network systems should continue to be provisioned with existing levels of video stream manipulation capabilities or better.

In network systems such as subscriber television systems, the digital video receiver is often the digital home communication terminal ("DHCT"), otherwise known as the set-top box. The DHCT should continue to provision the same or an improved level of usability and functionality to the end user in digital video services, such as video-on-demand and personal video recording.

Typically, a receiver capable of providing video services is connected to a subscriber network system. A video-services-enabled receiver (VSER) may be a mobile and/or a handheld device. Some VSERs, such as the DHCT, are located at the user's premises and connected to a subscriber television system, such as, for example, a cable or satellite network. A VSER includes hardware and software necessary to provide digital video services to the end user with various levels of usability and/or functionality. Some of the software executed by a VSER may be downloaded and/or updated via the subscriber network system. Each VSER also typically includes a processor, communication components, memory, and capability to output a video signal for display, either to a display device that is part of the same device housing the VSER or connected to the VSER. For instance, a DHCT is connected to a television or other display device, such as, for example, a personal computer. While many conventional VSERs are stand-alone devices that are externally connected to a television, such as a DHCT, the functionality of a VSER or DHCT may be integrated into a television or personal computer or even an audio device such as, for example, a programmable music player, as will be appreciated by those of ordinary skill in the art.

One of the features of the VSER includes the ability to receive and decompress a digital video signal in a compressed format. Another feature of some VSERs, such as a DHCT, includes providing Personal Video Recorder (PVR) functionality through the use of a storage device coupled to the DHCT or a storage device located remotely in the subscriber television system that is accessible by the DHCT. When providing this PVR functionality or other video stream manipulation functionality for video streams compressed and formatted in accordance with the Advanced Video Coding (AVC) standard, referred to herein as AVC streams, it becomes difficult to determine whether the video stream is suitable for a particular stream manipulation operation or for operations extending end user functionality such as different video playback modes. Likewise, it becomes difficult for video processing equipment located at any of several locations throughout a network system to fulfill manipulation operations on AVC streams. This is because the AVC standard generally has a rich set of compression tools and can exploit temporal redundancies among pictures in more elaborate and comprehensive ways than prior video coding standards.

AVC streams are more efficiently compressed than video streams coded with prior video coding standards. However, AVC streams tend to exhibit higher complexities in pictures' interdependencies that make it difficult to fulfill stream manipulation operations and provide end user functionality.

DESCRIPTION OF EXAMPLE EMBODIMENTS

Overview

Figure 1:
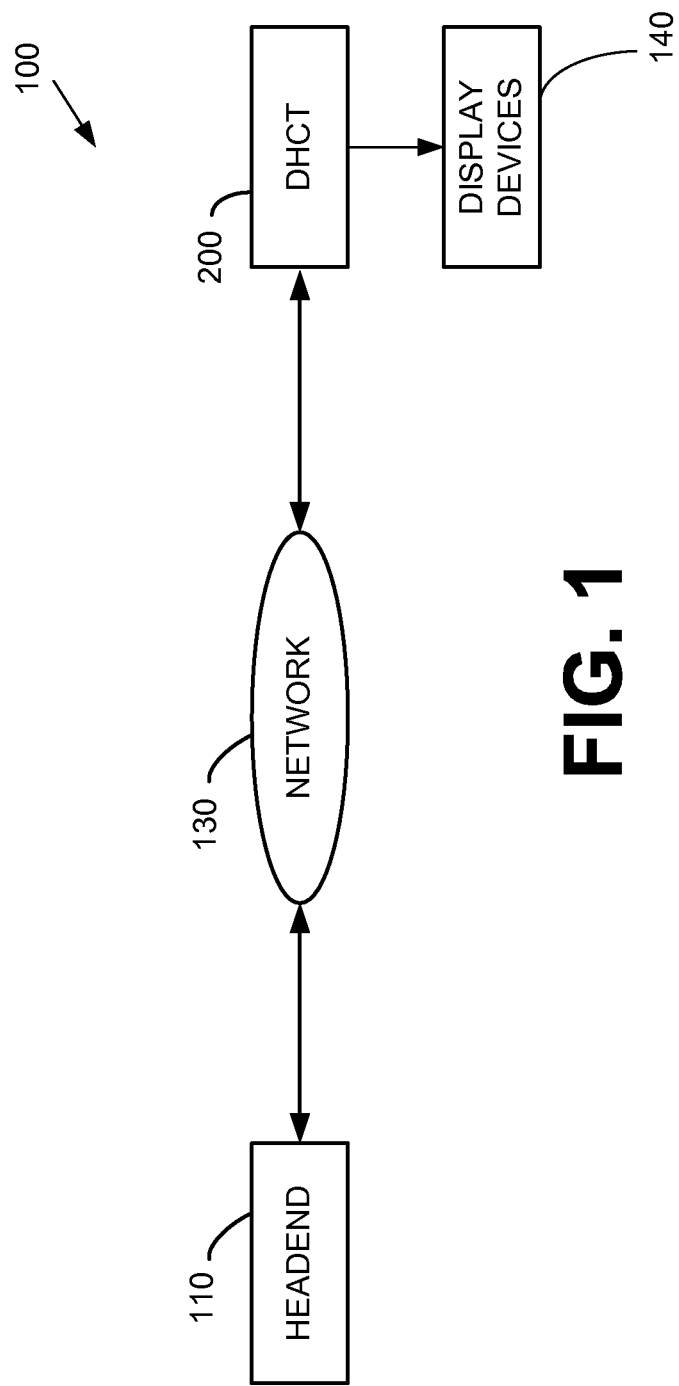
FIG. 1 is a high-level block diagram depicting an example subscriber television system, in accordance with one embodiment of the disclosure.

Particular embodiments communicate information that identifies pictures in a video stream that exhibit certain characteristics to assist in optimizing or provisioning video stream manipulation operations and to extend end user functionality. In one embodiment the invention provides a method for outputting auxiliary information for use in playing back a video sequence, the method comprising obtaining a measure of usefulness of a particular picture for playing back the video sequence, wherein the measure of usefulness indicates a performance of playing back the video sequence if the particular picture is available in a decoded state at a time of playback versus the particular picture not being available in a decoded state at a time of playback; determining a position in a data stream that includes the video sequence; and storing the auxiliary information at the determined position in the data stream.

Example Embodiments

A description of the MPEG-2 Video Coding standard can be found in the following publication, which is hereby incorporated by reference: (1) ISO/IEC 13818-2, (2000), "Information Technology—Generic coding of moving pictures and associated audio—Video." A description of the AVC video coding standard can be found in the following publication, which is hereby entirely incorporated by reference: (2) ITU-T Rec. H.264 (2005), "Advanced video coding for generic audiovisual services." A description of MPEG-2 Systems for transporting AVC video streams in MPEG-2 Transport packets can be found in the following publications, which are hereby entirely incorporated by reference: (3) ISO/IEC 13818-1, (2000), "Information Technology—Generic coding of moving pictures and associated audio—Part 1: Systems," and (4) ITU-T Rec. H.222.0|ISO/IEC 13818-1:2000/AMD.3, (2004), "Transport of AVC video data over ITU-T Rec. H222.0|ISO/IEC 13818-1 streams."

Disclosed herein are systems and methods for identifying pictures that exhibit one or more particular picture properties and/or picture-interdependency characteristics in a video stream. Throughout this specification, TOPIDC, which is short for "type-of-picture-identifying characteristic," refers to a type of picture characteristic that is formed by the specific combination of one of more picture properties and/or picture-interdependency characteristics, as will be described in greater detail below. Auxiliary information conveys the respective TOPIDC corresponding to one or more pictures in the video stream, thus allowing for the identification of pictures exhibiting the respective TOPIDC. In one embodiment, each respective TOPIDC corresponds to a specific combination resulting from one or more different picture properties and/or different types of picture-interdependency characteristics. In an alternate embodiment, each respective TOPIDC corresponds to a specific combination of one or more different types of picture-interdependency characteristics. In yet another embodiment, each respective TOPIDC corresponds to a specific combination of one or more different picture properties. In a general sense, the auxiliary information can include any measure of usefulness of a particular picture in displaying a video sequence. The measure of usefulness can indicate a performance of playing back the video sequence if the particular picture is available in a decoded state at a time of playback versus the particular picture not being available in a decoded state at a time of playback. The particular picture need not be part of the video sequence for which its usefulness is measured. Playback can include standard transport functions, so-called "trick plays" or other presentation operations. In other embodiments, picture usefulness can relate to other video operations rather than playback. For example, picture usefulness can be designated for storing, transferring, encoding or otherwise processing a video sequence.

It is noted that "picture" is used throughout this specification to refer to an image portion or complete image from a sequence of pictures that constitutes video, or digital video, in one of a plurality of forms. Throughout this specification, video programs or other reference to visual content should be understood to include television programs, movies, or any other signals that convey or define visual content such as, for example, those provided by a personal video camera. Such video programs, when transferred, can include compressed data streams corresponding to an ensemble of one or more sequence of pictures and other elements that include video, audio, and/or other data, multiplexed and packetized into a transport stream, such as, for example, MPEG-2 Transport.

A video stream can further refer to the compressed digital visual data corresponding to any video service or digital video application, including but not limited to, a video program, a video conferencing or video telephony session, any digital video application in which a video stream is transmitted or received through a communication channel in a network system, or any digital video application in which a video stream is stored in or retrieved from a storage device or memory device. The disclosed embodiments may be embodied in many different forms and should not be construed as limited to the embodiments set forth herein; rather, these embodiments are provided so that this disclosure will be thorough and complete, and will fully convey the scope of the disclosure to those having ordinary skill in the art. Although the DHCT is used as an example throughout the specification, particular embodiments described herein extend to other types of receivers with capabilities to receive and process AVC streams. For instance, particular embodiments are applicable to hand-held receivers and/or mobile receivers that are coupled to a network system via a communication channel. Particular embodiments are also applicable to any video-services-enabled receiver (VSER and further applicable to electronic devices such as media players with capabilities to process AVC streams, independent of whether these electronic devices are coupled to a network system. Furthermore, all embodiments, illustrations and examples given herein are intended to be non-limiting, and are provided as an example list among other examples contemplated but not shown.

FIG. 1 is a block diagram that depicts an example subscriber television system (STS) 100. In this example, the STS 100 includes a headend 110 and a DHCT 200 that are coupled via a network 130. The DHCT 200 is typically situated at a user's residence or place of business and may be a stand-alone unit or integrated into another device such as, for example, a display device 140 or a personal computer (not shown), among other devices. The DHCT 200 receives signals (video, audio and/or other data) including, for example, digital video signals in a compressed representation of a digitized video signal such as, for example, AVC streams modulated on a carrier signal, and/or analog information modulated on a carrier signal, among others, from the headend 110 through the network 130, and provides reverse information to the headend 110 through the network 130.

The network 130 may include any suitable medium for communicating television service data including, for example, a cable television network or a satellite television network, among others. The headend 110 may include one or more server devices (not shown) for providing video, audio, and other types of media or data to client devices such as, for example, the DHCT 200. The headend 110 and the DHCT 200 cooperate to provide a user with television services including, for example, video programs, an interactive program guide (IPG), and/or video-on-demand (VOD) presentations, among others. The television services are presented via the display device 140, which is typically a television set that, according to its type, is driven with an interlaced scan video signal or a progressive scan video signal. However, the display device 140 may also be any other device capable of displaying video images including, for example, a computer monitor. Although shown communicating with a display device 140, the DHCT 200 can communicate with other devices that receive, store, and/or process video streams from the DHCT 200, or that provide or transmit video streams or uncompressed video signals to the DHCT 200.

Figure 2:
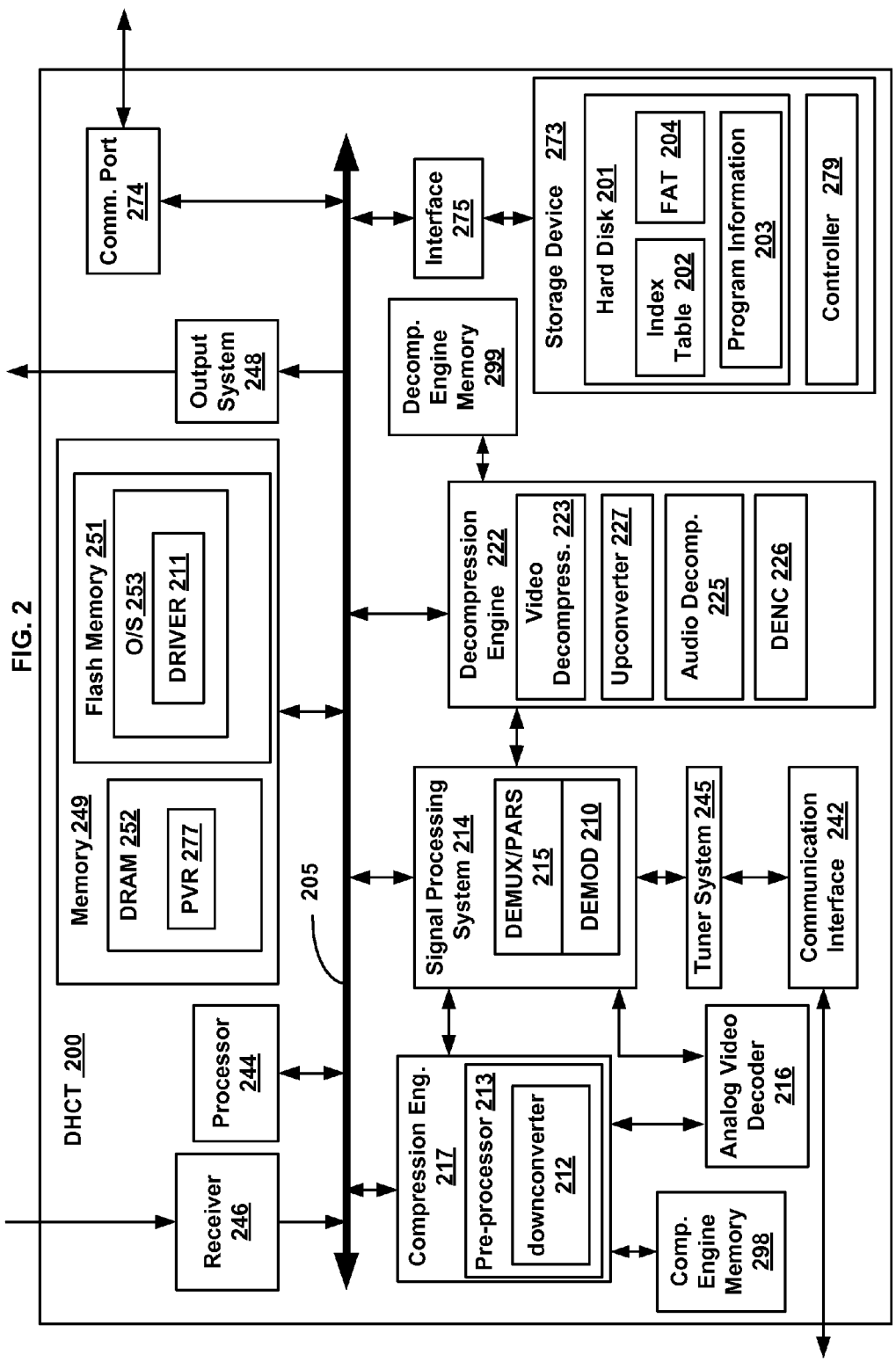
FIG. 2 is a block diagram of an exemplary digital home communication terminal (DHCT) as depicted in FIG. 1 and related equipment, in accordance with one embodiment of the disclosure.

FIG. 2 is a block diagram that illustrates an example of selected components of the DHCT. It will be understood that the DHCT 200 shown in FIG. 2 is merely illustrative and should not be construed as implying any limitations upon the scope of the disclosure. For example, in another embodiment, the DHCT 200 may have fewer, additional, and/or different components than the components illustrated in FIG. 2. Any of the described subsystems or methods of DHCT 200 can comprise an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

The DHCT 200 is generally situated at a user's residence or place of business and may be a stand alone unit or integrated into another device such as, for example, a television set or a personal computer. The DHCT 200 preferably includes a communications interface 242 for receiving signals (video, audio and/or other data) from the headend 110 (FIG. 1) through the network 130 (FIG. 1), and provides reverse information to the headend 110.

The DHCT 200 may further include at least one processor 244 for controlling operations of the DHCT 200, an output system 248 for driving the television display 140 (FIG. 1), and a tuner system 245 for tuning to a particular television channel and/or frequency and for sending and receiving various types of data to/from the headend 110 (FIG. 1). The DHCT 200 may include, in other embodiments, multiple tuners for receiving downloaded (or transmitted) data. The tuner system 245 can select from a plurality of transmission signals provided by the subscriber television system 100 (FIG. 1). The tuner system 245 enables the DHCT 200 to tune to downstream media and data transmissions, thereby allowing a user to receive digital media content via the subscriber television system 100. In one embodiment, analog TV signals can be received via tuner system 245. The tuner system 245 includes, in one implementation, an out-of-band tuner for bi-directional data communication and one or more tuners (in-band) for receiving television signals. Additionally, a receiver 246 receives externally-generated user inputs or commands from an input device such as, for example, a remote control device (not shown).

The DHCT 200 may include one or more wireless or wired interfaces, also called communication ports or interfaces 274, for receiving and/or transmitting data or video streams to other devices. For instance, the DHCT 200 may feature USB (Universal Serial Bus), Ethernet, IEEE-1394, serial, and/or parallel ports, etc. DHCT 200 may be connected to a home network or local network via communication interface 274. The DHCT 200 may also include an analog video input port for receiving analog video signals. User input may be provided via an input device such as, for example, a hand-held remote control device or a keyboard.

The DHCT 200 includes at least one storage device 273 for storing video streams received by the DHCT 200. A PVR application 277, in cooperation with operating system 253 and device driver 211, effects among other functions, read and/or write operations to/from the storage device 273. Processor 244 may provide and/or assist in control and program execution for operating system 253, device driver 211, applications (e.g., PVR 277), and data input and output. Herein, references to write and/or read operations to the storage device 273 can be understood to include operations to the medium or media of the storage device 273. The device driver 211 is generally a software module interfaced with and/or residing in the operating system 253. The device driver 211, under management of the operating system 253, communicates with the storage device controller 279 to provide the operating instructions for the storage device 273. As conventional device drivers and device controllers are well known to those of ordinary skill in the art, further discussion of the detailed working of each will not be described further here.

The storage device 273 can be located internal to the DHCT 200 and coupled to a common bus 205 through a communication interface 275. The communication interface 275 can include an integrated drive electronics (IDE), small computer system interface (SCSI), IEEE-1394 or universal serial bus (USB), among others. Alternatively or additionally, the storage device 273 can be externally connected to the DHCT 200 via a communication port 274. The communication port 274 may be according to the specification, for example, of IEEE-1394, USB, SCSI, or IDE. In one implementation, video streams are received in the DHCT 200 via communications interface 242 and stored in a temporary memory cache (not shown). The temporary memory cache may be a designated section of DRAM 252 or an independent memory attached directly, or as part of, a component in DHCT 200. The temporary cache is implemented and managed to enable media content transfers to the storage device 273. In some implementations, the fast access time and high data transfer rate characteristics of the storage device 273 enable media content to be read from the temporary cache and written to the storage device 273 in a sufficiently fast manner. Multiple simultaneous data transfer operations may be implemented so that while data is being transferred from the temporary cache to the storage device 273, additional data may be received and stored in the temporary cache.

The DHCT 200 includes a signal processing system 214, which comprises a demodulating system 210 and a transport demultiplexing and parsing system 215 (herein demultiplexing system) for processing broadcast media content and/or data. One or more of the components of the signal processing system 214 can be implemented with software, a combination of software and hardware, or simply in hardware. The demodulating system 210 comprises functionality for demodulating analog or digital transmission signals.

A compression engine can reside at headend 110, in DHCT 200, or elsewhere. A compression engine can receive a digitized uncompressed video signal, such as, for example, one provided by analog video decoder 216, or a decompressed video signal produced by a decompression engine as a result of decompressing a compressed video signal.

In one embodiment, digitized pictures and respective audio output by the analog video decoder 216 are presented at the input of a compression engine 217, which compresses the uncompressed sequence of digitized pictures according to the syntax and semantics of a video compression specification. Thus, compression engine 217 performs a video compression method or algorithm that corresponds to a respective video compression specification, such as the AVC standard.

The systems and methods disclosed herein are applicable to any video compression method performed according to a video compression specification allowing for at least one type of compressed picture that can depend on the corresponding decompressed version of each of more than one reference picture for its decompression and reconstruction. For example, compression engine 217 may compress the input video according to the specification of the AVC standard and produce an AVC stream containing different types of compressed pictures, some that may have a first compressed portion that depends on a first reference picture for their decompression and reconstruction, and a second compressed portion of the same picture that depends on a second and different reference picture.

In an alternate embodiment, a compression engine with similar compression capabilities, such as one that can produce AVC streams, is connected to DHCT 200 via communication port 274, for example, as part of a home network. In another embodiment, a compression engine with similar compression capabilities, such as one that can produce AVC streams, may be located at headend 110 or elsewhere in network 130.

Unless otherwise specified, a compression engine used to describe the invention may reside at headend 110, in DHCT 200 (e.g., as compression engine 217), connected to DHCT 200 via communication port 274, or elsewhere. Likewise, a video processing device used to describe the invention may reside at headend 110, in DHCT 200, connected to DHCT 200 via communication port 274, or elsewhere. In one embodiment, the compression engine and video processing device reside at the same location. In another embodiment, they reside at different locations. In yet another embodiment, the compression engine and video processing device are the same device.

Figure 3:
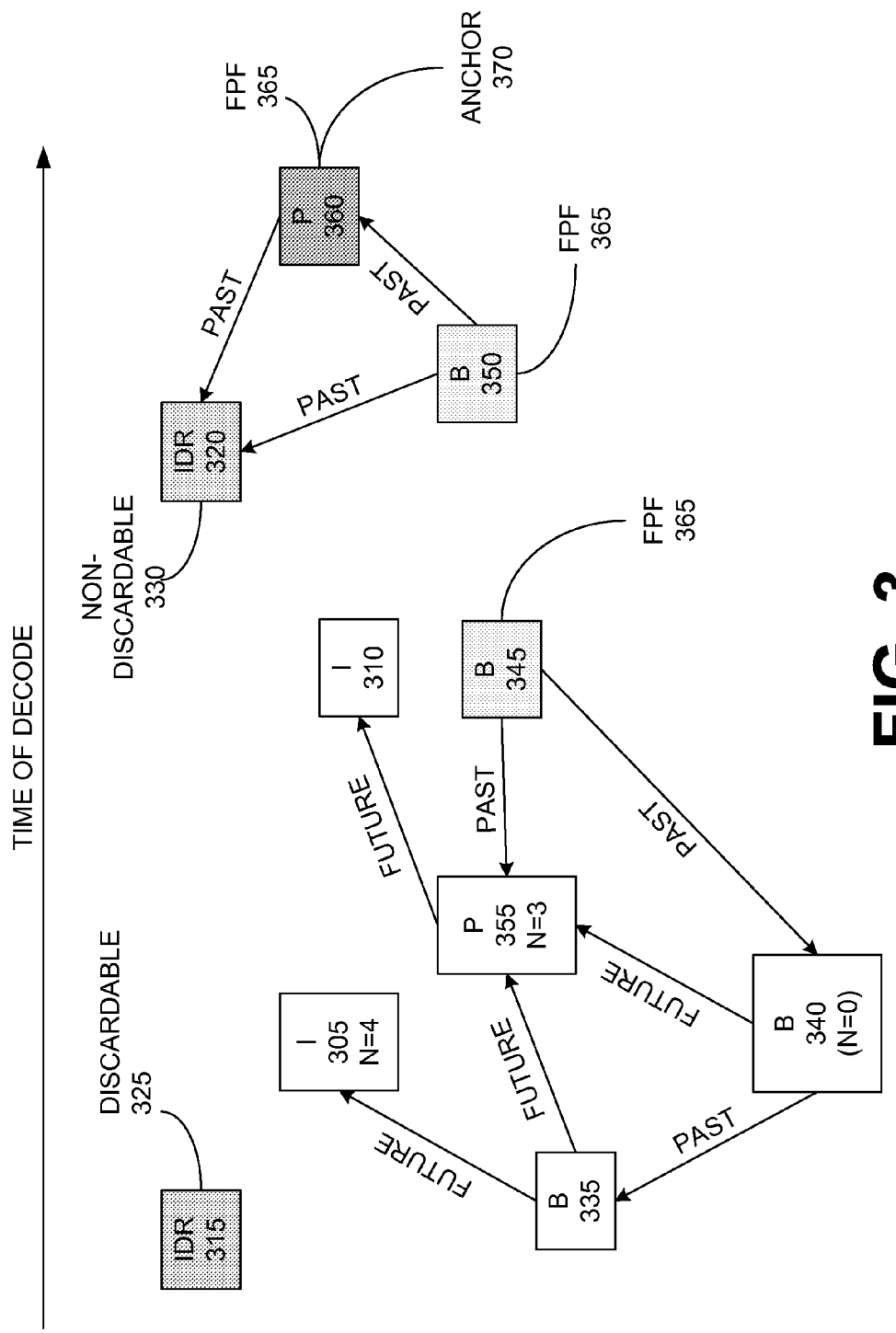
FIG. 3 illustrates H.264 picture types.

FIG. 3 illustrates H.264 picture types, and shows the hierarchical nature of dependency between picture types which can be exploited by a stream generator when selecting pictures. Proper decoding of some pictures depends on particular other pictures. Therefore, if one picture serves as a reference picture to other pictures, it be considered more important than other pictures. In fact, a particular set of pictures can be viewed in a hierarchy of importance, based on picture type, total number of dependent pictures for each reference picture, number of levels of dependencies for each reference picture, and other factors.

An I-picture (305, 310) is dependent on (i.e., references) no other pictures. An instantaneous decoding refresh picture (315, 320) or IDR-picture is an I-picture that forces all previously decoded pictures, that are still in use as reference pictures, to no longer be used as reference pictures upon decoding of the IDR picture. One embodiment of a stream generator (RSG) selects only IDR-pictures for inclusion in a stream. Another embodiment selects only IDR-pictures and I-pictures. Yet another embodiment selects only those pictures that are IDRs, but does not select all IDRs. Yet another embodiment selects only pictures that are IDRs or I-pictures, but does not select all the IDRs or I-pictures.

An I-picture that serves as a reference picture for other types of pictures is referred to in this disclosure as a non-discardable picture (325), where an I-picture that does not serve as a reference picture for any other picture is a discardable picture (330). In FIG. 3, I-picture 315 is discardable, while I-picture 320 is non-discardable.

A B-picture (335, 340, 345, 350) inter-predicts some of the picture's portions from at least two previously decoded reference pictures. A P-picture (355, 360) allows some of the picture's portions to be inter-predicted from a previously decoded reference picture. For instance, a first portion of a P-picture can depend on one previously decoded reference picture and another portion of the same P-picture can depend on a different reference picture.

A person of ordinary skill in the art should appreciate that some pictures will serve as reference pictures for many pictures. Said another way, many different pictures may depend on the same reference picture. For example, any particular I-picture typically serves as a reference pictures for many B-pictures and P-pictures.

An anchor picture (370) can be an I-picture, IDR-picture, or a special type of FPP (forward predicted picture) that depends only on a single reference picture that is the most-recently decoded anchor picture.

The terms "depend" or "dependence" in the context of reference pictures typically means a direct dependence. An example of indirect dependence follows. Suppose picture R1 serves as a reference for picture R2, and that R2 serves as a reference for picture F3. F3 then indirectly depends on F1. (A person of ordinary skill in the art should also recognize that F3 directly depends on R2, and R2 directly depends on R1.)

Pictures can be categorized as having a particular dependency "level", and some embodiments of a stream generator can include only pictures at or below a particular level for inclusion in a stream. The picture's level may be understood as a measure of its importance in decoding other pictures—some reference pictures are more important than other reference pictures because their decoded and reconstructed information propagates through more than one level of referencing.

One embodiment uses an intuitive definition of levels: I-pictures are first-level (an I-picture depends on no other level); pictures with only direct dependencies are second-level; and pictures with any indirect dependencies are third-level and above.

Other embodiments may define levels in different ways. In another embodiment, an IDR picture is considered a first-level reference picture, an I-picture is considered a second-level reference picture, and an anchor picture that is a FPF is considered a third-level reference picture.

In other embodiments, an anchor picture is considered to be a first-level reference picture. In other embodiments, an anchor picture is considered a first-level reference picture only if the video encoder uses relative lower quantization values (resulting in more bits in the compressed picture) that results a in higher number of bits relative to reference pictures with higher levels.

In these embodiments, a second-level reference picture is a reference picture that is not an anchor picture, and that references only one or more anchor pictures. One example of this is a bi-directional predicted picture in between two anchor pictures. Another example is a picture which is backward-predicted from an anchor picture. Yet another example is a picture that is forward-predicted from two anchor pictures. In some embodiments in which an anchor picture that is a FPF is a third-level reference picture, a fourth-level reference picture is a reference picture referencing only anchor pictures.

An importance criteria involving the relative importance of pictures may use one or more, in any combination, of the following:

Picture-type: IDR, I, P or B.

Reference or non-reference picture. As described above, a non-reference picture is a discardable picture.

Type of reference picture (e.g., past, future, or bi-directionally referenced).

Number of pictures, N, directly depending on a reference picture.
Level of information propagation via indirect dependence.
Longevity it serves as a reference picture.
Longevity of information propagation.
First picture after a random access point (RAP), according to the amended MPEG-2 Systems standard for carrying an AVC stream.
Size (number of bits) of the compressed picture.
The amount of delay from the decode time of a picture to its output time.

A person of ordinary skill in the art should also recognize that although H.264 picture types are used in this disclosure, the systems and methods disclosed herein are applicable to any digital video stream that compresses one picture with reference to another picture or pictures.

Figure 4:
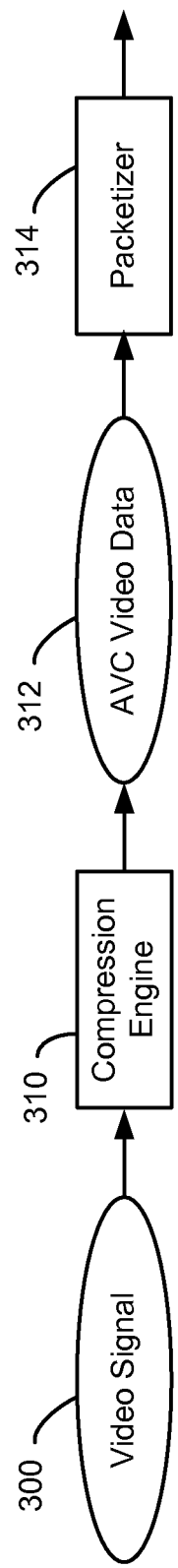
FIG. 4 is an exemplary diagram illustrating a transport stream generation.

FIG. 4 is a block diagram that illustrates selected components in the generation of the portion of a transport stream containing an AVC stream and corresponding auxiliary information that identifies pictures exhibiting a particular TOPIDC (auxiliary info). The compression engine 310 receives as input a video signal 300, such as a digitized uncompressed video signal or a decompressed video signal. The compression engine 310 outputs AVC video data 312, such as AVC compressed pictures and associated parameters. AVC video data 312 may be further encapsulated into Network Abstraction Layer (NAL) units an AVC stream in transmission order. Packetizer 314 packetizes AVC video data 312 to output a stream of packets.

An AVC stream is used as an example throughout this specification. However, particular embodiments are also applicable to any compressed video stream compressed according to a video compression specification allowing for: (1) any picture to be compressed by referencing more than one other picture, and/or (2) any compressed picture that does not deterministically convey or imply its actual picture-interdependency characteristics from its corresponding picture-type information in the AVC stream. Herein, we refer to the "picture-type" corresponding to an AVC compressed picture as the information conveyed by one or possibly more respective fields in the AVC stream with semantics conveying a "type of picture" or a type of "slice." That is, in accordance with the AVC standard, the picture-type may be conveyed in an AVC stream by different methods. For instance, the picture-type may be expressed by the "primary_pic_type" field in the "access unit delimiter." Alternatively, the picture-type may be expressed collectively by one or more "slice_type" fields corresponding respectively to each of one or more respective slices of the AVC compressed picture. The "slice_header" of each slice of an AVC compressed picture includes its "slice_type" field. An AVC compressed picture may have only one slice. Although picture type information (i.e., auxiliary information) is described as being transferred in specific fields or parts of standard formats, other placements or methods to convey the auxiliary information are possible. The auxiliary information can be included in the adaptation layer (as described herein) or in any other layer, structure, stream, unit, position or location. For example, the auxiliary data can be included in a stream that is separate from the picture information to which it is associated. The auxiliary data may be conveyed embedded into the picture information, itself, or it can be included in a data structure or hardware component that is separated from the picture information.

There are two main methods of compressing pictures in AVC, Intra and Inter (or Non-Intra) compression. Intra compression is done without reference to other pictures but typically exhibits less compression efficiency than Inter compression. Inter compression exploits temporal redundancy and irrelevancy by referencing one or more other pictures. A reference picture is depended on by at least one other picture for its compression. The decompressed version of the reference picture is used during AVC compression performed by a compression engine to predict at least one portion of a picture that depends on the reference picture. During decompression of an AVC stream performed by a decompression engine, such as decompression engine 222 in DHCT 200, a reference picture is also depended on to decompress and reconstruct at least a portion of at least one other picture. A picture that is not a reference picture (i.e., that is not depended on by at least one other picture) is a non-reference picture.

It should be understood that throughout this specification, the term "depend" or "dependence" in context to reference pictures means a "direct" dependence. These terms do not refer to an indirect dependence, such as the propagation of second picture's data through referencing a first picture that in turn referenced the second picture.

The output time of a picture, or picture-output time, refers to its display time, which is at the time of, or after, it has been completely decompressed and reconstructed. For instance, the output time of a picture corresponds to the time that output system 248 in DHCT 200 provides the decompressed version of an AVC picture to display device 140. To output a picture means to output its decompressed version. A decode-time-stamp (DTS) and a presentation-time-stamp (PTS) is typically associated with a picture in an AVC stream in accordance with the specification for transporting AVC streams in the amended MPEG-2 Systems standard. The PTS of a picture, whether provided in the transport stream or derived by decompression engine 222 in DHCT 200, corresponds to its hypothetical output time during fulfillment of a normal playback mode of the AVC stream. The DTS of picture corresponds to its decompression time and can also be provided in the transport stream or derived by decompression engine 222 in DHCT 200. Successive compressed pictures in an AVC stream are decompressed in their transmission order by decompression engine 222 in DHCT 200, and thus have successive decompression times. Although embodiments of the invention presented herein primarily take into account and realize advantages in decoding, embodiments can also focus on analysis and optimization of presentation order. In general, the picture type information can be used by any software process, hardware device (or combination thereof) at any point in a creation, encoding, distribution, processing/decoding and display chain in order to realize a benefit.

The transmission order of pictures is established in accordance with several ordering rules, each with a respective priority. The highest-priority ordering rule enforces each reference picture to be transmitted in the AVC stream prior to all the pictures that reference it. A second ordering rule with high priority enforces pictures that would otherwise have the same ordering priority, to be transmitted in order of their respective output time, from the earliest to the latest.

Video coding standards typically assume a hypothetical instantaneous decoder, meaning that a compressed picture can be instantaneously decompressed at its DTS. A picture's PTS may equal its DTS, thus the hypothetical instantaneous decoder assumes in such case that the picture is decompressed and output instantaneously.

A picture-output interval is defined according to the picture rate, or frame rate, of the AVC stream. For instance, if the AVC stream corresponds to a video signal at 60 pictures-per-sound, the picture-output interval is approximately equal to 16.66 milliseconds. Each consecutive picture-output interval begins at a picture-output time, and a picture is output throughout the picture-output interval. In one embodiment, the actual output time of each picture output by decompression engine 222 is delayed from its hypothetical output time, or PTS, by one picture-output interval. That is, the actual output time of every picture equals the PTS of the picture plus one picture-output interval. A past reference picture is a previously-decompressed reference picture that has an output time prior to the picture referencing it. Likewise, a future reference picture is a previously-decompressed reference picture that has an output time after the picture referencing it.

An AVC Intra picture, or I-picture, does not reference other pictures but is typically referenced by other pictures. Unlike MPEG-2 Video, Intra compression in AVC allows for prediction of the region of the picture being compressed from the decompressed version of other portions of the same picture. An AVC "instantaneous decoding refresh" picture, or IDR-picture, is an I-picture that forces all previously decompressed pictures that are being used as reference pictures to no longer be used as reference pictures upon decompression of the IDR picture. P-pictures and B-pictures in AVC are allowed to contain intra-compressed portions. As in MPEG-2 Video, P-pictures and B-pictures in AVC allow for any, and possibly all, of a picture's portions to be inter-predicted from "previously-decompressed" reference pictures. Also similar to MPEG-2 Video, inter-prediction of any portion of a P-picture in AVC is limited to using at most one reference picture at a time. However, in contrast to MPEG-2 Video, each different inter-predicted portion of an AVC P-picture is allowed to be predicted from any one of several distinct reference pictures. Similar to MPEG-2 Video, inter-prediction of any portion of a B-picture in AVC is limited to using at most two reference pictures. But whereas MPEG-2 Video uses at most two reference pictures for all of the B-picture, any of several distinct reference pictures is allowed to be used on each different inter-predicted portion of an AVC B-picture.

The number of total reference pictures depended on by different AVC P-pictures may be respectively different. Similarly, the number of total reference pictures depended on by different AVC B-pictures may be respectively different. In accordance with the AVC standard, the "maximum number" of allowed reference pictures in an AVC stream varies depending on the specified "Level" for an AVC stream and the spatial resolution of the compressed pictures in that AVC stream. Furthermore, AVC reference pictures have no predetermined location in relation to the picture referencing them. These flexibilities in the AVC standard result in better compression efficiency. However, they hinder stream manipulation capabilities of video processing devices since no inferences can be implied about the picture-interdependency characteristics of a compressed picture in an AVC stream that has a picture-type of a P-picture or a B-picture.

Thus, the AVC standard specifies a P-picture by allowing each different inter-predicted portion of the picture to be predicted from "at most one" of any of a plurality of different reference pictures, as for example, 16 reference pictures. Unlike the MPEG-2 video standard or other video compression specifications that further limit inter-prediction to referencing one "predetermined" past reference picture, in AVC there is no such limitation. For instance, a first portion of an AVC P-picture can depend on one reference picture and another portion on a different reference picture. In fact, a picture referenced by a first portion of an AVC P-picture may be a past reference picture, and a second portion may depend on a future reference picture. As another example of the elaborate and complex picture-interdependencies allowed in AVC, a first AVC P-picture may depend on four future reference pictures, a second AVC P-picture may depend on three past reference pictures, and a third AVC P-picture may depend on both, a plurality of past reference pictures and a plurality of future reference pictures.

The AVC standard also specifies the B-picture differently than does the MPEG-2 video standard. MPEG-2 video specifies a B picture as a bidirectional picture, allowing for any portion of the picture to be compressed with a dependence of not more than two reference pictures, one a "predetermined" future reference picture, and the other a "predetermined" past reference picture. The same two reference pictures, or either of them, must be used as the reference pictures for predicting any portion of the B-picture. On the other hand, an AVC B-picture can depend on a plurality of reference pictures, for instance, up to 16 reference pictures, as long as any region of the B-picture is predicted by at most two regions in the plurality of reference pictures. When a region of the B-picture is predicted by two regions, it is said to be bi-predicted rather than bi-directionally predicted. In further contrast to MPEG-2 Video, an AVC B-picture is allowed to be used as a reference picture by other P-pictures or B-pictures.

As an example of the elaborate and complex picture-interdependencies allowed in AVC B-pictures, a first region of an AVC B-picture is allowed to be bi-predicted from two past reference pictures, a second region bi-predicted from two future reference pictures, a third region bi-predicted from a past reference picture and a future reference picture, and these three regions depend on six different reference pictures. The set of reference pictures used by a first B-picture in the AVC stream may be different than the set of reference pictures used by a second B-picture, even if they are both in consecutive transmission order or have consecutive output times. As described previously, AVC reference pictures have no predetermined location in relation to the picture referencing them. It should be apparent that many types and combinations of picture (or picture portion) dependencies are possible and that different types of auxiliary information can be created to describe the interdependencies or relationships among the pictures in order to provide benefits to later processing of the picture information.

To exemplify further that picture-type does not convey an AVC compressed picture's TOPIDC, note that an I-picture that does not serve as a reference picture is a non-reference picture. Furthermore, some I-pictures may be more important than other I-pictures, depending on the relative location of the I-picture in the AVC-stream and/or on how many other AVC compressed pictures reference the I-picture.

It should be appreciated that while some video compression specifications have picture-types that respectively imply specific picture inter-dependency characteristics, the picture-type of a compressed picture in an AVC stream cannot be relied on for implying an AVC compressed picture that exhibits a particular TOPIDC. Besides, even if the picture-type would be able to convey useful information, there are other aspects that make it difficult to easily peek and identify pictures with a certain TOPIDC in an AVC stream, such as, when the payload of transport packets carrying the AVC stream are encrypted or scrambled. Finding the slice_type and other desired data fields in transport packet's payload to verify a certain characteristic of the picture may be difficult and require significant traversing into the AVC stream, especially if a desired data field's alignment relative to the start of a transport packet's payload or relative to some other identifiable delimiter varies.

Thus, particular embodiments provide, receive, and process unscrambled auxiliary information in the transport packets that carry the AVC stream to convey TOPIDCs that identify corresponding pictures in the AVC stream that exhibit certain TOPIDCs. A conveyed TOPIDC identify pictures in the AVC stream that exhibit that TOPIDC. Furthermore, to extend efficiency in stream manipulation operations there is a need to identify the corresponding pictures in the AVC stream with minimal processing of the transport packets, with minimal, or if possible without, traversing into the AVC stream in the payload of the transport packets. As described in detail below, the auxiliary information in the transport stream is in the form of one or more data fields corresponding to respective pictures in the AVC stream. The values of the respective one or more data fields convey one or more TOPIDCs for the corresponding picture, which is herein referred to as the identified picture.

Throughout this specification, a sequence of consecutive pictures in the AVC stream, or consecutive pictures in the AVC stream, refers to of the consecutive compressed pictures in their transmission order, or equivalently, a sequence of compressed pictures in the AVC stream having successive decode-time-stamps. Unless otherwise specified, when the TOPIDC of an identified picture implicates a sequence of N consecutive pictures, the N consecutive pictures are in the AVC stream and the first of the N consecutive pictures is the identified picture. The $N^{th}$ consecutive picture is the last of the N consecutive pictures.

A picture property corresponding to the identified picture in the AVC stream conveys information in one or more data fields that relate to:
1. A certain picture property at the identified picture's output time.
2. A certain picture property at the identified picture's decompression time.
3. A certain picture property at the output time of N consecutive pictures.
4. A certain picture property at the output time of $N^{th}$ consecutive picture.
5. A certain picture property at the decompression time of N consecutive pictures.
6. A certain picture property at the decompression time of $N^{th}$ consecutive picture.
7. The starting location of one or more consecutive pictures having a certain TOPIDC in relation to the identified picture's location. That is, the identified picture is not the first picture in the one or more consecutive pictures.
8. The location of one or more pictures within N consecutive pictures, with the one or more pictures having a certain TOPIDC.
9. The location of one or more pictures within N consecutive pictures, with the one or more pictures having a first TOPIDC, and the N consecutive pictures having a second TOPIDC.
10. The identified picture's location in the AVC stream in relation to the location of where a certain AVC stream property becomes effective, which according to the certain AVC stream property is either at the output time or the decompression time. A stream property is as described in detail below.
11. A certain relationship among any combination of one or more of the above picture properties.
12. A picture property of an identified picture may become effective at the identified picture's decompression time. Another picture property may become effective at the picture-output time of the identified picture.

The following two picture properties may be useful for some stream manipulation operations:
1. N consecutive pictures having successive output times corresponding respectively to their transmission order.
2. N consecutive pictures, having N successive output times, but with their output order different than their transmission order.

An output-delay-property conveys with the respective values of two data fields, D and N, the difference between the decompression time of the first of N consecutive pictures (i.e., the identified picture) and the first picture-output time among N consecutive pictures. The difference equals D picture-output intervals. Alternatively, instead of the difference, D may convey the actual first picture-output time among N consecutive pictures. In one embodiment, an output-delay-property is only provided if all N pictures can be output without missing information. For instance, under some circumstances, the output-delay-property is not provided if one or more pictures referenced by at least one of the N consecutive pictures is not available and decompression of at least a portion of the at least one picture will have incomplete information or incorrect pixel values.

A complete-information-property conveys with the value of one data field, N, the location of a second picture in the AVC stream in relation to the identified picture's location that conveys that all pictures output after the decompression time of the second picture will have complete information and correct pixel values. Alternatively, complete-information-property conveys that all pictures output at and after the DTS of the second picture will have complete information and correct pixel values. In another embodiment, complete information and correct pixel values is at and after the PTS of the second picture. In an alternate embodiment, complete information and correct pixel values is after the PTS of the second picture. In yet another embodiment, the complete-information-property conveys with a second data one of four values that respectively identify when the complete information becomes effective: at the second picture's DTS, PTS, DTS+1, or PTS+1.

A discardable picture is a non-reference picture. A discardable picture with a delayed output time (DPWDO) is a discardable picture having a PTS that is later than its DTS. That is, it is a discardable picture that is not output immediately after it is decompressed, and although it is not referenced by any other picture, it enters the "decoded picture buffer" (DPB) specified in the AVC standard for at least one picture-output interval. The DPB resides in decompression memory 299 of DHCT 200.

An importance-level-property conveys with the values of two data fields, T and L, the TOPIDC, T, of the identified picture, and the identified picture's importance level, L, with respect to a plurality of predefined importance levels for pictures that exhibit the "T" TOPIDC. The plurality of predefined importance levels is necessary to distinguish among pictures having a first TOPIDC but that also may have a second TOPIDC, such as a particular picture property. For instance, the $K^{th}$ picture in a sequence of N discardable pictures may be more important than the other N−1 discardable pictures if the compression engine provided higher picture quality to the $K^{th}$ picture. For example, the compression may have employed lower quantization values in the $K^{th}$ picture than in the other N−1 pictures. Importance levels may be also defined according to the relative location of each picture in the N consecutive pictures. For instance, the picture in the middle of N consecutive discardable pictures may be deemed of higher importance to allow a network processing device to selectively drop the less important pictures during network congestion or lack of bandwidth. Retaining the middle picture from the sequence of N discardable pictures reduces the deviation from the original temporal sampling of the video signal and mitigates the presentation of a jerky video program to the end user. Likewise, a reference pictures that are referenced only by discardable pictures may be deemed less important than reference pictures that are referenced by other reference pictures.

In one embodiment, a first AVC stream is provided in a first sequence of transport packets corresponding to a transport stream. The first AVC stream includes a sequence of consecutive compressed pictures. Information in the transport stream, such as a Program Map Table (PMT) and Program Association Table (PAT), identify that the first sequence of transports packets corresponds to the first AVC stream. A first data field corresponding to a first TOPIDC is provided in a particular transport packet in the first sequence of transports packets. The particular transport packet is referred to herein as the "auxiliary information transport packet," or AI-packet. A second transport packet, also in the first sequence of transports packets, provides a second data field conveying information, such as a start code, a delimiter, or a random point access point, indicating that the payload of the second transport packet provides the start of a compressed picture in the first AVC stream. The second transport packet is referred to herein as the "picture transport packet," or P-packet. The location of the AI-packet in relation to the P-packet's location in the first sequence of transports packets determines that the first data field corresponds to the compressed picture that starts in the P-packet. A first value of the first data field is assigned to convey the first TOPIDC and identifies that the corresponding picture exhibits the first TOPIDC. A second value of the first data field does not convey the first TOPIDC and does not identify that the corresponding picture exhibits the first TOPIDC.

The presence of the second data field, such as a start code or delimiter, in a transport packet may convey that the transport packet is a P-packet. A corresponding value of the second data field may convey that the transport packet is a P-packet. In one embodiment, the second data field is the payload section of the P-packet. In another embodiment, the second data field is external to the payload, such as in the adaptation header of a transport packet.

Figure 5:
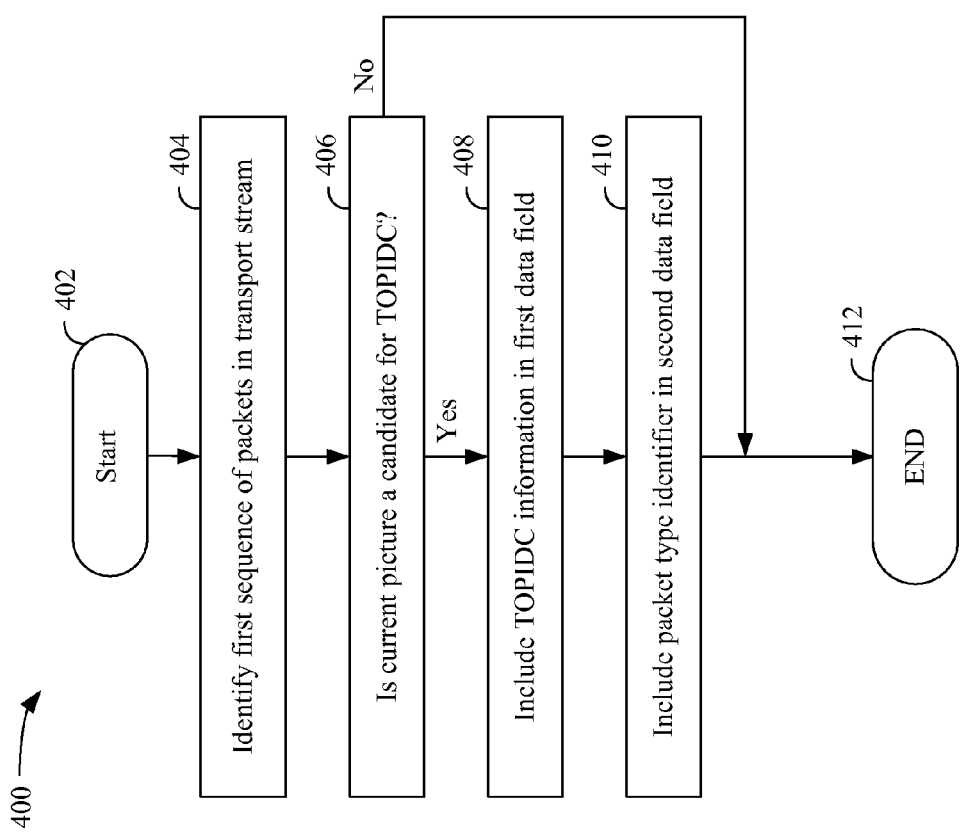
FIG. 5 is an example of a routine that provides auxiliary information to identify a picture qualifying for a TOPIDC.

FIG. 5 is an example of a routine 400 performed by a compression engine or a video processing that provides auxiliary information to identify a picture qualifying for a TOPIDC. The routine is entered at 402 when it is desired to place auxiliary information such as a TOPIDC into video information. At 404 the first sequence of transport packets in the transport stream is identified.

At 406 a determination is made as to whether a current picture in the sequence should have an associated TOPIDC. At 408, the value for the first data field in the first packet of the sequence of transport packets is set to the TOPIDC value according to one or more of the methods for indicating characteristics, properties or interdependencies discussed herein. Since this first packet now includes auxiliary information it can be referred to as an Auxiliary Information (AI) packet. The compression engine or video processing device provides the corresponding picture, for example, a P-picture, starting with the P-packet, in the AI packet. At 410, the second data field is provided with a value that conveys that the transport packet is a P-packet. The routine exits at 412. In one embodiment, the AI-packet and the P-packet can be the same transport packet. The compression engine or a video processing device provides the first sequence of transport packets for transmission to DHCT 200 over network 130. In another embodiment, the first sequence of transport packets is provided to DHCT 200 via communication port 274. In yet another embodiment, compression engine 217 in DHCT 200 provides the first sequence of transport packets.

The DHCT 200 receives a video program in a transport stream. The DHCT 200, as described in detail below, receives and processes the first transport stream, including the first and second transport packets. The 200 DHCT determines the association of the first data field to the first picture by the location of the first data field in the first transport packet. In an alternate embodiment, the DHCT 200 determines the association of the first data to the first picture by the relative location of the first and second data packets. The DHCT 200 identifies that the first picture exhibits the first TOPIDC if the value of the first data field equals the first value.

Alternatively, the value of the first data field is pre-assigned to the first TOPIDC In an alternate embodiment, the location of the first transport packet carrying the first data field in relation to the location of a second transport packet carrying a start code, a delimiter, or a random access point pertaining to the first picture associates the field data field with the first picture.

In one embodiment the second value of the first data field does not convey the first TOPIDC and identifies that corresponding picture does not exhibit the first TOPIDC.

In one embodiment, when performing a PVR application, the DHCT 200 receives a transport stream corresponding to a video program. The DHCT receives and processes the auxiliary information corresponding to one or more TOPIDCs, such as the output-delay-property, the complete-information-property, or the importance-level-property, while it produces the annotations corresponding to a video program to fulfill or enhance PVR functionality provided to an end user, such as trick modes, as described in detail later.

A VOD application or VOD server located either at head-end 110 or network 130, may use the auxiliary information corresponding to one or more TOPIDCs, such as the output-delay-property, the complete-information-property, or the importance-level-property, to fulfill or enhance a VOD service of a video program to an end user. For instance, the information of one or more TOPIDCs may be used to enhance trick modes.

The relative location from the identified picture to a second picture that has a particular picture property, or TOPIDC, can be expressed by N, the number of consecutive pictures between them in the AVC stream, inclusive of the identified picture. A data field conveys the value for N. The data field may be pre-assigned to a particular TOPIDC so a "non-zero" value is sufficient to identify the $N^{th}$ picture in the AVC stream as the picture exhibiting the particular TOPIDC. In an alternate embodiment, values for an additional data field are pre-assigned to convey a corresponding different TOPIDC. Thus, the additional data field's value conveys a TOPIDC for the $N^{th}$ picture.

Another data field may be pre-assigned for conveying N consecutive pictures having a particular TOPIDC. The data field may be pre-assigned to the particular TOPIDC so the absence of a "null" or "zero" value signifies one or more consecutive pictures as having the particular TOPIDC. Alternatively, values for a second data field are pre-assigned to correspond respectively to different TOPIDCs. Thus, the second data field's value conveys a corresponding TOPIDC for the sequence of N consecutive pictures.

In one embodiment, a first data field corresponds to a first TOPIDC and conveys a value, N, for the number of consecutive pictures, starting with the identified picture, that have the first TOPIDC. A second data field identifies a second TOPIDC. The second data field may identify one or more pictures of the N consecutive compressed pictures that have a second TOPIDC. The second data field may be pre-assigned to correspond to the second TOPIDC. Alternatively, a third data field may convey the second TOPIDC with a corresponding pre-assigned value.

Information conveying a stream property provides: (1) a location in the AVC stream where the stream property becomes effective, and (2) information related and identifying a particular stream property. The conveyed information enables a video processing device to perform a corresponding stream manipulation operation that is suitable to be performed at the location in the AVC stream where identified particular stream property is effective. For instance, a first stream property may be an "exit point for splicing," which is a location in the AVC stream suitable for transitioning from the AVC stream into another AVC stream, such as an advert or commercial. In one embodiment, a stream property conveys additional information that assists or guides the stream manipulation operation. In another embodiment, the stream manipulation operation has to be performed according to the conveyed additional information.

In one embodiment, a picture property, or TOPIDC, corresponding to the first picture of N consecutive pictures in a first AVC stream (i.e., the identified picture) conveys information for a particular stream property corresponding to an "exit point for splicing" (or, equivalently, an "entry point for splicing" depending on the frame of reference from the first sequence or second sequence, respectively) that allows a stream splicing operation to be performed from the first AVC stream to a second AVC stream. A first data field provides a value, N, corresponding to the number of consecutive pictures, including the first picture, to identify the location after the $N^{th}$ picture and prior to the $(N+1)^{th}$ picture as the location in the first AVC stream where the "exit point for splicing" becomes effective. A second data field provides a value, M, that conveys the number of decompressed pictures in the decoded picture buffer (DPB) that have successive picture-output times (or presentation time-stamps), with the first of the successive output times being at the picture-output time immediately after the decompression time of the $N^{th}$ picture. The DPB is in accordance with the AVC standard and resides in decompression memory 299 of DHCT 200. The location in the AVC stream where the "exit point for splicing" becomes effective equals the decompression time of the $N^{th}$ picture (i.e., under the assumption of a hypothetical instantaneous decoder). The earliest output time of the M decompressed pictures of the first AVC stream residing in the DPB, PTS (1_of_M), equals the decompression time of the $N^{th}$ picture plus one picture-output interval. That is, it is at the next picture-output time, thus PTS(1_of_M)=DTS(N_of_N)+1.

The M decompressed pictures in the DPB with successive output times may have been in successive order in the first AVC stream. In one embodiment, the corresponding compressed M pictures were not in successive order in the first AVC stream.

The number of picture-output times from the decompression of the first of the N consecutive picture, DTS(1_of_N), to the picture-output time of the last of the M pictures in the DPB, PTS(M_of_M), equals (N+M). Hence, there are (N+M) different pictures that are output from the first AVC stream up to the "exit point for splicing." Each of the (N+M) different pictures has a respective PTS corresponding to one of (N+M) consecutive picture-output times, the first picture-output time being coincident with DTS(1_of_N).

In one embodiment, a first AVC stream is required to exhibit the following properties at the location where the "exit point for splicing" becomes effective:

1. An AVC decompression engine 222 that receives and decompresses a portion of the first AVC stream, that ends with the $N^{th}$ picture and includes the N consecutive pictures, must be able to:
   A. Output all of the N consecutive pictures between the (N+M) picture-output times starting with and including DTS(1_of_N and ending with PTS(M_of_M), and
   B. Output (N+M) different pictures during these (N+M) consecutive picture-output times.
2. No picture in the first AVC stream prior to and including the $N^{th}$ picture must have an output time after PTS (M_of_M).

In summary, a compression engine or video processing device may not provide an "exit point for splicing" that results in a discontinuity or gap for any of the (M+N) picture-output times, possibly forcing a previously output picture to be output repeatedly (i.e., because the picture corresponding to a respective picture-output time was not in the first AVC stream prior to the exit point for splicing"). If a picture had an output time after PTS(M_of_M), it would reside in the DPB and not be output. A video processing device and/or compression engine provides a particular TOPIDC corresponding to an "exit point for splicing" only if the corresponding location in the stream satisfies the above properties.

A splice operation of the first AVC stream to the second AVC stream is performed by a video splicing device (not shown), located in headend 110, network 130 or elsewhere, by using values of the first data field and second data field, N and M, respectively, provided in the transport stream carrying the first AVC stream. The provision of data fields in the transport stream is described in detail below. The video splicing device uses the N and M values to produce a third AVC stream comprising of a portion of the first AVC stream followed by the second AVC stream. The portion of the first AVC stream in the third AVC stream terminates at the location of the first AVC stream after the $N^{th}$ picture. The first picture of second AVC stream (FPOSAS) that follows the $N^{th}$ picture in the third stream is referred to as the FPOSAS-picture. The video splicing device produces the third AVC stream with an overlapped transition period of M picture-output times. That is, the video splicing device produces the third AVC stream such that following four conditions:

1. The M pictures from the first AVC stream with successive output times and residing in the DPB buffer at "exit splice point," are assigned a respective PTS for each of the M picture-output times in accordance with their original output order,
2. None of the pictures from the first AVC stream are decompressed during the overlapped transition period. That is, the latest DTS assigned to a picture from the first AVC stream is prior to the start of the overlapped transition period.
3. M pictures from the second AVC stream, starting with the FPOSAS-picture, are decompressed during the overlapped transition period.
4. None of the pictures from the second AVC stream are output during the overlapped transition period. The earliest picture-output time assigned to a picture from the second AVC stream is one picture-output time after the end of the overlapped transition period.

The third AVC stream is received by DHCT 200 and decompression is performed on the compressed picture of the third AVC stream by decompression engine 222. Decompressed pictures are stored in decompression memory 299. Output system 248 serves to output (e.g., to display device 140) the decompressed pictures at their respective output times. Orchestration of decompression and outputting of pictures is performed according to the respective DTS and PTS of each picture in the third AVC stream. When the portion of the third AVC stream corresponding to the spliced first and second AVC streams is processed by decompression engine 222, the overlapped transition period comes into effect. During the overlapped transition period, decompression engine decompress M consecutive pictures that emanated from the second AVC stream while outputting the last M pictures from the first AVC stream.

In one embodiment, at least one of the N consecutive pictures prior to the identified "exit point for splicing" in the first AVC stream is also one of the M decompressed pictures of the first AVC stream in the DPB with successive output times at the time that the "exit point for splicing" becomes effective.

In one embodiment, N is required to be greater than M to announce the "exit point for splicing" in the first AVC stream with sufficient lead time before it becomes effective. In an alternate embodiment, N>M and N is also greater than a pre-specified threshold (e.g., three picture-output intervals or picture-output times). In yet another embodiment, the same "exit point for splicing" is announced N times with auxiliary information corresponding respectively to each of the N consecutive picture in the first AVC stream. That is, starting with the first of the N consecutive in the first AVC stream, N instances of auxiliary information is provided in the transport stream, each instance corresponding respectively to one of the N consecutive pictures. The auxiliary information corresponding to each of the N consecutive pictures conveys respective values for the first data field and second data field associated with a particular TOPIDC: an "exit point for splicing." The first data field's value is N for the first picture and decreases by one successively in each successive instance of the auxiliary information and corresponds to each one of the successive pictures in the sequence of N consecutive pictures. The first data field's value, N, finally becomes equal to one for the $N^{th}$ picture. The second data field's value remains constant, equal to M, through the N successive instances of the auxiliary information that respective correspond to the N consecutive pictures. Two different "video splicing devices" may use two different announcement instances (i.e., instances of auxiliary information) in the first AVC stream to prepare and perform the transition to the second AVC stream at the identified location of the "exit point for splicing" of the first AVC stream. A third "video splicing device" may use more than one or more, and possibly all N of instances of auxiliary information to prepare and perform the transition.

In one embodiment, the video splicing device that produces the third AVC stream sets the decompression time for the FPOSAS-picture equal to PTS(1_of_M), which is also equal to the DTS(N_of_N)+1.

In one embodiment, video splicing device provides the FPOSAS-picture with an output time equal to M picture-output times after its decompression time and the FPOSAS-picture serves as a past reference picture to at least one picture with a DTS greater than the DTS of the FPOSAS-picture. Thus, M picture-output times are added to the DTS of the FPOSAS-picture. In another embodiment, the FPOSAS-picture in the third AVC stream is provided a picture-output time less than M picture-output times after its decompression time, forcing a shortened overlapped transition period and at least one of the M pictures from the portion of the first AVC stream to not be displayed. In yet another embodiment, the output time of the FPOSAS-picture is greater than or equal to (M+1) picture-output times after its DTS, and the FPOSAS-picture serves as a future reference picture to at least one picture with a DTS greater than the DTS of the FPOSAS-picture, including the picture from the second AVC stream that has an output time equal M picture-output times after the decompression time of the FPOSAS-picture.

The FPOSAS-picture in the third AVC may be an IDR-picture. In another embodiment, he FPOSAS-picture in the third AVC may be an IDR-picture or an I-picture. In yet another embodiment, the FPOSAS-picture in the third AVC stream is an I-picture.

In one embodiment, a compression engine that produces the first AVC stream provides each picture in the first AVC stream with their respective picture-output time delayed by one picture-output interval to cause the value of M to be increased by one. Although the maximum number of reference pictures that can be retained in the DPB is reduced by one, it benefits the splicing operation by lengthening the overlapped transition period from the first AVC stream to the second AVC stream by one picture-output interval. The longer overlapped transition period tends to reduce any potential increase in the bit-rate of the third AVC stream that may manifest as a result of starting compression at the FPOSAS-picture without the benefit of reference pictures.

In an alternate embodiment, a video splicing device provides a longer overlapped transition period by causing the last picture output from the portion of the first AVC stream to be output repeatedly over one or more extra picture-output intervals and setting the respective picture-output times for the pictures from the portion of the second AVC stream accordingly.

In one embodiment, the video splicing device producing the third AVC stream retains in the transport stream the original information that conveyed the "exit point for splicing" for the first AVC stream. The third AVC stream may then be spliced at a later time at the location in the third AVC stream where the "exit point for splicing" becomes effective. Thus the portion of the third AVC stream containing the first AVC stream can be retained and the portion corresponding to the second AVC stream can be overwritten, in part or in its entirety, starting with the FPOSAS-picture. As a non-limiting example, when the second AVC stream corresponds to a first commercial, this allows for another splice operation to be performed to overwrite the second AVC stream by a fourth AVC stream that corresponds to a second commercial. The stream splicing operation from the third AVC stream to the fourth AVC stream can be performed by a different video splicing device than the one that produced the third AVC video stream. The produced fifth AVC stream comprises of the portion of the first AVC stream in the third AVC stream followed by the fourth AVC stream.

In one embodiment, the video splicing device producing the third AVC stream uses the auxiliary information corresponding to one or more additional TOPIDCs, such as the output-delay-property, the complete-information-property, or the importance-level-property, as described in detail above, in addition to the conveyed information for the "exit point for splicing, to perform and enhance the splicing of the first and second AVC streams.

In one embodiment, auxiliary information conveying an "exit point for splicing" and corresponding to the first of N consecutive pictures in the first AVC stream, as described in detail above, also includes a third data field that provides a value corresponding to P consecutive pictures prior to, but not including, the first of N consecutive pictures (i.e., the identified picture). Whereas N conveys the location in the first AVC stream where the "exit point for splicing" becomes effective, P conveys the number of consecutive pictures in the first AVC stream that must be decompressed prior to the first of the N consecutive pictures so that all (N+M) pictures can be output with their complete information. For instance, if a user has merely started receiving a broadcast video program, it may not be possible to obtain all the information to decompress some pictures that depend on reference pictures that were transmitted prior to when the user started receiving the program. Likewise, some pictures may indirectly depend on some reference pictures that are not available. In an alternate embodiment, P may be the number of pictures that must be decompressed prior to the $N^{th}$ picture, and P>N. In another embodiment, P pictures must be decompressed to guarantee the output with complete information of the M pictures in the DPB.

In yet another embodiment, auxiliary information conveying an "exit point for splicing" is only provided at a location in the AVC stream that guarantees the output with complete information of the M pictures in the DPB. Alternatively, it is only provided at a location in the AVC stream that guarantees the output with complete information of the (N+M) pictures.

The methods and systems disclosed herein are capable of providing or processing auxiliary information corresponding to certain TOPIDCs that may include, but not limited to, any combination of one or more of the following types of picture-interdependency characteristics:
1. Dependence only on a specific type of reference picture.
2. Dependence on a specific number of reference pictures.
3. Dependence to only one or more past reference pictures.
4. Without dependence to any future reference picture.
5. Dependence to only one or more future reference pictures.
6. Without dependence to any past reference picture.
7. AVC picture-type, as defined by the AVC video coding standard.
8. Discardable picture (i.e., a picture not referenced by any other picture).
9. First picture in a sequence of N consecutive pictures with each picture having a TOPIDC that is in a particular predefined set of one or more TOPIDCs, where N is greater than or equal to 1.

Certain TOPIDCs may be defined for pictures that satisfy a specific combination of one or more of the above types of picture-interdependency characteristics. In an alternate embodiment, TOPIDCs can be defined for certain specific combination of one or more of the above types of picture-interdependency characteristics and one or more picture properties, as described in detail above.

"Dependence only on a specific type of reference picture" may refer to dependence on a specific AVC picture-type or a picture that has a particular TOPIDC. An example of the former case is a picture that references only I-pictures.

In one embodiment, several specific combinations of one or more TOPIDCs are important for stream manipulation operations and/or application usability and functionality purposes. It is desirable to identify pictures that exhibit each of such specific combinations of TOPIDCs as a separate "special type of picture." Thus, a special type of picture (STOP) is predefined for each corresponding "specific combination of TOPIDCs." Examples of desirable STOPs include, but are not limited to, the following:
1. FP-picture or FPP. A picture that depends only on one or more past reference pictures, referred to as a Forward Predicted Picture (FPP). An AVC P-picture or an AVC B-picture can be a FPP.
2. BP-picture or BPP. A picture that depends only on future reference pictures, referred to as a Backward Predicted Picture (BPP). An AVC P-picture or an AVC B-picture can be a BPP.
3. An Anchor Picture, which is an I-picture, IDR-picture, or a special type of FPP that depends only on a single reference picture that is the most-recently decompressed Anchor Picture.
4. SRBP-picture or SRBPP. A Single-referencing BPP (SRBPP), which is a BPP that depends only on a single reference picture that is the most-recently decompressed Anchor Picture.
5. FSR-picture or FSRP. A First-Seed Reference Picture, which is a picture that: (1) only references the two most-recently decompressed Anchor Pictures, (2) the picture decompressed immediately after the last decompressed Anchor Picture, (3) is a reference picture.
6. BFSR-picture or BFSRP. A Bi-directional First-seed Reference Picture, which is a bi-directionally predicted FSR-picture from the two most-recently decompressed Anchor Pictures.
7. MPSD-picture or MPSDP. A Middle Picture in a Sequence of Discardable Pictures (MPSDP) is the picture in the middle of N consecutive discardable pictures.
8. DPWDO-picture or DPWDO. A Discardable Picture With a Delayed Output Time (DPWDO), defined previously. A DPWDO has a PTS after its DTS and resides in the DPB for at least one picture-output time (i.e., one picture-output interval).
9. HPD-picture or HPDP. A High-Priority Discardable Picture (HPDP) is a picture deemed to have higher importance than non-HPDP. An HPD-picture may be an MPSD-picture.
10. LSR-picture or LSRP. A Least-Significant-Reference Picture (LSRP) is a reference picture that is referenced only by discardable pictures.
11. FD-picture or FDP. A First Discardable Picture (FDP), which is the first picture (i.e., the identified picture) in a sequence of consecutive discardable pictures in the AVC stream, each with successive output times corresponding respectively to their order in the AVC stream.
12. FIDO-picture or FIDOP. A First In-display-order Picture (FIDOP), which is the first picture (i.e., the identified picture) in a sequence of consecutive pictures with each picture, except the FIDOP, does not have dependence on any future reference picture. While the FIDOP may also not depend on any future reference picture, it is allowed to be a BP-picture or a bi-directional predicted picture. In one embodiment, the number of consecutive pictures, N, is conveyed with the FIDO-picture. In another embodiment, the FIDO-picture does not depend on any future reference picture.
13. LIDO-picture or LIDOP. A Last In-display-order Picture (LIDOP), which is the first picture in a sequence of N consecutive pictures that has the latest output time among them. In one embodiment, the LIDO-picture is a future reference picture to the other (N−1) pictures.

In addition to the above STOPs, certain AVC picture types, such as an IDR-picture and I-picture, are important to be identified via auxiliary information in the transport stream.

As an example, an MPSDP TOPIDC can be conveyed by the auxiliary information corresponding to third picture of a sequence of five consecutive discadable pictures. When, N is an even integer, the picture at the location N/2 or (N/2+1) can be identified as the MPSDP. However, if N is an even integer and larger, two MPSDPs can be identified. For instance, if N=8, the third and sixth pictures can be identified as MPSDPs since one of the benefits of MPSDP, as described previously, is to provision which pictures in the sequence of discardable pictures to retain under network congestion or lack of bandwidth availability to retain the temporal sampling of the original video signal as much as possible. A LSRP may be deemed discardable under certain network congestions or lack of bandwidth availability.

Note that a First-Seed Reference Picture, or FSR-picture, follows the second Anchor Picture in transmission order. Note also that a First-seed Picture references both, the first and second Anchor Pictures.

In one embodiment, reference pictures are deemed to have the following order of importance levels.
1. IDR-picture,
2. I-picture,
3. Anchor Picture,
4. FSR-picture or BFSR-picture,
5. Other types of reference picture, if any.
6. LSR-picture.

Other types of reference picture may, for example, include Second-Seed Reference Pictures, which are reference pictures that depends on at least one FSP-picture, and is allowed to depend only on FSR-pictures or Anchor Pictures. In an alternate embodiment, an I-picture and Anchor Picture have the same importance level. FSR-picture and BFSR-picture may have respective consecutive importance levels.

The disclosed methods and systems are capable of providing or processing auxiliary information that identifies pictures in a corresponding AVC stream having a particular TOPIDC. A video processing device or a compression engine in one of the locations in an alternate embodiment, the auxiliary information identifies the relative location in the AVC stream of the pictures that have a certain TOPIDC.

The AVC stream and corresponding auxiliary information may be produced by a video processing device and/or compression engine external to DHCT 200. The video processing device and/or compression engine may be located, for example, at headend 110 or connected to DHCT 200 via communication port 274. The video processing device and/or compression engine further packetizes the produced AVC stream and its corresponding auxiliary information into MPEG-2 Transport packets in accordance with the specification for transporting AVC streams in the amended MPEG-2 Systems standard. Alternatively, another transport stream specification or program stream specification may be employed. In one embodiment, video processing device and/or compression engine external to DHCT 200 also communicate with a security and encryption device to further produce the AVC stream in encrypted form.

Alternatively, compression engine 217, in communication with processor 244, produces in DHCT 200 AVC stream and its corresponding auxiliary information, packetizes them into MPEG-2 Transport, and stores the MPEG-2 Transport stream in storage device 273. Alternatively, another transport stream specification or program stream specification may be employed. In one embodiment, processor 244 and compression engine 217 also communicate with a security and encryption device (not shown) to produce the provided AVC stream in encrypted form but the auxiliary information corresponding to TOPIDCs is not.

In accordance with the MPEG-2 Systems standard, each MPEG-2 transport packet is 188 bytes and contains a 4-byte header with a unique packet identifier, or PID, that identifies the transport packet's corresponding stream. An optional adaptation field may follow the transport packet's header. The payload containing a portion of the corresponding stream follows the adaptation field, if present in transport packet. If the adaptation field is not present, the payload follows the transport header. The auxiliary information corresponding to the compressed pictures in the AVC stream is provided in the adaptation field and thus not considered as part of the video layer since the adaptation field is not part of transport packet's payload nor part of the AVC specification but rather part of the syntax and semantics of MPEG-2 Transport in accordance with the MPEG-2 Systems standard.

The adaptation field provides for the carriage of defined privately data. The TOPIDC corresponding to an AVC stream is a defined private data set. However, misinterpretation of different defined privately data sets must be avoided since each private data set has a different format, syntax and semantic. Misinterpretation may lead to a malfunction in the DHCT or VSER. In one embodiment, misinterpretation of the defined private data carried by the adaptation field is avoided by assigning a unique identification tag exclusively to each defined private data set. Each unique identification tag is used to prefix its corresponding defined private data set.

In one embodiment, the unique identification tag may be cross-linked with service information (SI) that is received a priori by DHCT 200, preferably from headend 110 via network 130. SI indicates the unique identification tag(s) active in a service. For instance, the SI of each service that employs AVC streams may provide the unique identification tag corresponding to one or more TOPIDCs of the AVC stream.

In another embodiment, the unique identification tag associated with the AVC stream of a video program is provided as an "adaptation field data identifier" in the Program Map Table (PMT), according to the MPEG-2 Systems. For instance, the unique identifier tag may be provided in the Descriptor Loop of the PMT. The PMT is received a priori by DHCT 200, preferably from headend 110 via network 130.

A transport packet containing an adaptation field providing the auxiliary data corresponding to the AVC stream also carries a payload for a portion of the AVC stream. In an alternate embodiment, the transport packet containing an adaptation field providing the auxiliary data corresponding to the AVC stream does not contain a payload, and, therefore, does not carry any portion of the AVC stream. In yet another embodiment, the transport packets containing adaptation fields with the auxiliary data corresponding to the AVC stream have a PID value different than the PID value of the AVC stream.

The auxiliary information corresponding to the AVC stream is never scrambled or encrypted. In one embodiment, the corresponding AVC stream is encrypted. Although the payload of a transport packet containing a portion of the AVC stream is encrypted, the preceding adaptation field in the same transport packet carrying the auxiliary information is not. In an alternate embodiment the corresponding AVC stream is not encrypted.

In one embodiment, when a transport packet carries the auxiliary information corresponding to the AVC stream and payload for a portion of the AVC stream, the payload is required to include the start of an AVC access unit in accordance with the specification for transporting AVC streams of the amended MPEG-2 Systems standard.

In another embodiment, a transport packet associated with the AVC stream that includes the adaptation header and the random_point_indicator bit set to "1" in the included adaptation header, and carrying in its payload the start of an AVC access unit, also includes a auxiliary information corresponding to a TOPIDC of one or more pictures.

In one embodiment, the transport packet containing the start of an AVC access unit for a picture exhibiting a certain TOPIDC always includes auxiliary information conveying the TOPIDC corresponding to that picture. The auxiliary information is provided in the form of a data field in the adaptation field of that transport packet. The data field is designated to indicate whether the corresponding picture exhibits a certain TOPIDC or not. Given the complexity and range of different types of picture-interdependency characteristics and picture properties possible in an AVC stream, a plurality of data fields may be respectively designated to corresponding different TOPIDCs. Each respective data field can be a single bit and a bit value of "1" identifies that the corresponding picture exhibits the TOPIDC corresponding to the data field. A bit value of "0" identifies that the corresponding picture does not exhibit that TOPIDC.

The adaptation field may provide a plurality of auxiliary information, each corresponding to a different TOPIDC, and the value of each auxiliary information respectively identifying whether a picture in the AVC stream has the corresponding TOPIDC or not. For instance, a first auxiliary information and a second auxiliary information (e.g., two data fields or two bits) may respectively identify two different TOPIDCs. Some pictures may not exhibit either TOPIDCs and are not identified by the first and second auxiliary information. Furthermore, the transport packet containing the start of an AVC access unit for such picture may not have an adaptation field.

DHCT 200 receives the AVC stream and its corresponding auxiliary information in MPEG-2 Transport packets, either through communication interface 242 or communication port 274. Alternatively, DHCT 200 processes an AVC stream and its corresponding auxiliary information in MPEG-2 Transport packets retrieved from storage device 273. Each transport packet contains a header with a unique packet identifier, or PID.

The demultiplexing system 215 provides MPEG-2 transport demultiplexing and parsing capabilities. When tuned to carrier frequencies carrying a digital transmission signal, the demultiplexing system 215 enables the ingestion of packets of data, corresponding to the desired AVC stream, for further processing. A transport packet associated with the AVC stream is identified by its corresponding PID value in the packet's header. Concurrently, the demultiplexing system 215 precludes further processing of packets in the multiplexed transport stream that are irrelevant or not desired, such as packets of data corresponding to other video streams. Parsing capabilities of the demultiplexing system 215 allow for the ingesting by DHCT 200 of packets containing an adaptation field providing auxiliary information corresponding to the AVC stream being ingested. Additional parsing capabilities allow for the detection of the start of each compressed picture in the AVC stream delivered in the payload of received transport packets. When an adaptation field providing the auxiliary information corresponding to the AVC stream is detected by demultiplexing and parsing system 215, the auxiliary information is passed to memory 249 and processor 244 is informed, for instance with a message or an interrupt mechanism, to interpret the auxiliary information.

If the corresponding AVC stream is encrypted, it is decrypted with a security system in DHCT 200 that is capable of performing decryption (not shown). An unencrypted or decrypted AVC stream is transferred to memory 249, memory internal to decompression engine 222, or memory 299 for performing decompression by decompression engine 222.

Signal processing system 214 has capabilities, such as filters, to detect bit patterns corresponding to fields in the transport packet's header information, adaptation field, and payload. For instance, start codes and Network Abstraction Layer (NAL) units in the AVC stream may be detected. The transport packets contain the AVC stream, which are in a packetized elementary stream (PES), in accordance with the specification of the MPEG-2 Systems standard. Pictures identified with auxiliary information may be found by their respective "picture start code" or "delimiter NAL unit" that encapsulates the picture, or both. The "delimiter NAL unit" is in accordance with the AVC standard and the amended MPEG-2 Systems standard for carrying AVC streams. Tracking of consecutive "picture start codes" or "delimiter NAL units," facilitate tracking consecutive pictures in the AVC stream and finding an identified picture.

The components of the signal processing system 214 are generally capable of demodulation (e.g., QAM demodulation), forward error correction, demultiplexing of MPEG-2 transport streams, and parsing of packets and streams. Stream parsing may include parsing of packetized elementary streams or elementary streams. Packet parsing includes parsing and processing of fields, such as the adaptation fields in the transport packets that deliver auxiliary information corresponding to the TOPIDC exhibited by one or more pictures in the AVC stream. The signal processing system 214 further communicates with the processor 244 via interrupt and messaging capabilities of the DHCT 200. The processor 244 interprets and/or processes the auxiliary information corresponding to the AVC stream. For certain applications or video services, such as PVR, as the AVC stream is received and stored in storage device 273, processor 244 annotates the location of pictures within the AVC stream as well as other pertinent information corresponding to the TOPIDC of each picture, if any. Alternatively or additionally, the annotations may be according to or derived from the TOPIDC corresponding to a set of pictures in the AVC stream. The annotations produced by the processor 244 may be stored in storage device 273 and enable normal playback as well as other playback modes of the stored instance of the AVC stream. Other playback modes, often referred to as "trick modes," may comprise backward or reverse playback, forward playback, or pause or still. A trick mode may be characterized by: (1) its speed as a multiplicative factor in relation to the speed of the normal playback mode, and (2) its direction, either forward or reverse. Some playback speeds may be slower than normal speed and others may be faster. Faster playback speeds may constitute speeds considered very fast (e.g., greater than three times normal playback speed), as determined by a threshold, and critical faster speeds (e.g., greater than normal playback speed but not above the threshold). This threshold can be referred to as the critical fast-speed threshold. In one embodiment, the critical fast-speed threshold is further influenced by the picture rate implemented by output system 248 to output the video signal corresponding to decompressed version of the pictures of the AVC stream to display 140. In another embodiment, the basis is further determined on whether the output system 248 is providing a progressive or interlaced video signal to display 140.

In some embodiments, information corresponding to the TOPIDC of each compressed picture in the AVC stream is provided to the decompression engine 222 by the processor 244 as the AVC stream is received and processed in DHCT 200. In another embodiment, the annotations stored in the storage device are provided to the decompression engine 222 by the processor 244 during playback of a trick mode. In yet another embodiment, the information corresponding to the TOPIDC of each compressed picture, or sets of compressed pictures, as well as relevant annotations that may be necessary are only provided to the decompression engine 222 during a trick mode, wherein the processor 244 has programmed the decompression engine 222 to perform trick modes.

The auxiliary information that identifies the pictures in a video stream having a certain TOPIDC, the relative location of pictures in a video stream having a certain TOPIDC, or the number of sequential pictures having a certain TOPIDC, can be processed by network components (not shown) in network 130 or headend 110. Such network components have capability to process and interpret transport packets for the purpose of performing or fulfilling a certain functionality required for a video service or an application. Such network components may perform a particular stream manipulation operation based on the TOPIDCs, if any, corresponding to the respective compressed pictures, preferably doing so without parsing or decompressing the AVC stream or with a reduced amount of parsing, interpretation, and/or decompression of the AVC stream.

For a video-on-demand (VOD) service, wherein a dedicated transmission of a movie or video program is transmitted from a VOD server in the headend 110 to the DHCT 200, the auxiliary information corresponding to the pictures having a certain TOPIDC in the AVC stream are only transmitted to the DHCT 200 when a trick mode is in effect. In one embodiment, the decompression engine 222 is conditioned by processor 244 for trick mode operation in accordance with a low delay playback mode behavior. Alternatively, decompression engine 222 performs a trick mode operation when it receives and detects a "low delay" signal or message, allowing the AVC compressed pictured buffer (CPB), where the incoming portions of the AVC stream are deposited (in memory 299), to underflow as necessary. Low delay signaling causes the decompression engine 222 to: (1) not start decompressing a compressed picture until it is completely deposited in the CPB, and (2) to output to display 140 the previous decompressed picture repeatedly (rather than generate an error condition) until the next compressed picture is completely received, decompressed and reconstructed.

In one embodiment, the AVC stream in the transport packets payloads are outputted by the signal processing system 214 and presented as input to the decompression engine 222 for audio and/or video decompression, in concert with demultiplexing system 215 parsing (e.g., reading and interpreting) transport packets, and depositing the auxiliary information corresponding to the TOPIDC of the pictures in the AVC stream into DRAM 252.

In one embodiment, the auxiliary information identifies at least one picture in the corresponding AVC stream that has a first TOPIDC (e.g., a discardable picture). For a video service or application with trick mode functionality support, such as PVR, the decompression engine 222 does not decompress the pictures identified to have the first TOPIDC during the fulfillment of a first trick mode. Such pictures can be referred to as skipped pictures during the fulfillment of the first trick mode. A picture in the AVC stream that is not identified to have the first TOPIDC is decompressed by decompression engine 222 and displayed via output system 248 during the fulfillment of the first trick mode. Pictures identified to exhibit the first TOPIDC may be decompressed and displayed during a second trick mode different than the first trick mode.

In an alternate embodiment, processor 244 performs interpretation of the auxiliary information corresponding to the AVC stream and causes decompression engine 222 to forgo decompression of pictures identified to have the first TOPIDC by prohibiting their delivery to decompression engine 222. Furthermore, processor 244 may cause pictures exhibiting the first TOPIDC to not be retrieved from storage device 273.

In an alternate embodiment, processor 244 interprets the auxiliary information that identifies pictures in the corresponding AVC stream that have a first TOPIDC, such as a discardable picture, and associates them as potential skipped pictures for the trick modes in a first set of trick modes. Each trick mode in the first set is different from each other. Processor 244 determines the trick modes in the first set of trick modes according to their direction and speed in relation to the critical fast-speed threshold. For a common portion of an AVC stream, processor 244 has the capability to determine for each respective trick mode in the first set of trick modes a corresponding set of pictures to skip among the identified pictures. The set and/or number of skipped pictures (i.e, not decompressed) when fulfilling two different trick modes are different.

Depending on the speed and direction of the trick mode, a skipped picture results in a corresponding pair of behaviors: (1) a decompression behavior, and (2) an output behavior. For example, while fulfilling a first trick mode, a skipped picture (a picture exhibiting the first TOPIDC) results in decompression engine 222 decompressing and outputting an alternate picture in the AVC stream. However, during a second trick mode different than the first trick mode, the same picture in the AVC stream is skipped but the decompression engine does not perform decompression of an alternate picture in the AVC stream and the previously decompressed and output picture is output repeatedly at least once. In a third trick mode, the same picture in the AVC stream is skipped and the corresponding pair of behaviors are: (1) the decompression engine 222 decompresses an alternate picture in the AVC stream, and (2) the previously decompressed and output picture is output repeatedly at least once.

In one embodiment, first auxiliary information in the adaptation field of the transport packet corresponds to a sequence of consecutive compressed pictures in the AVC stream. The first auxiliary information includes a plurality of consecutive data fields (e.g., bits), each data field corresponding to a respective picture in the sequence of consecutive compressed pictures. The order of the consecutive data fields corresponds to the order of the pictures in the sequence of consecutive compressed pictures. The value of each data field identifies whether the corresponding picture has a first TOPIDC or not. A picture whose corresponding data field in the first auxiliary information equals a first value is identified as a picture with the first TOPIDC, whereas if the data field has a second value different than the first value, the corresponding picture is identified as not exhibiting the first TOPIDC. For instance, the data field can be a bit and a bit value of "1" identifies that its corresponding picture exhibits the first TOPIDC. By using a set of contiguous fields in the same order for the set of corresponding pictures, the relative location of the pictures in the set of contiguous pictures is identified.

The presence of auxiliary information corresponding to the TOPIDC of a picture or a sequence of compressed pictures may be signaled by a flag in the adaptation field of the transport packet to convey the presence of auxiliary information. A first value for the flag (e.g., a bit equal to "1") indicates the presence of one or more data fields respectively designated to corresponding different TOPIDCs. Each respective data field can be a single bit and a bit value of "1" identifies that the corresponding picture exhibits the TOPIDC corresponding to the data field. A bit value of "0" identifies that the corresponding picture does not exhibit that TOPIDC. For example, a bit equal to one can provide deterministic inference for the relative location in the compressed video stream for each picture in a sequence of consecutive compressed picture that is a discardable picture.

In one embodiment, a first flag may be designated to signal the presence of a first set of one or more data fields corresponding respectively to a first set of TOPICDs. A second flag may be designated to signal the presence of a second set of one or more data fields corresponding respectively to a second set of TOPICDs.

Although the description has been described with respect to particular embodiments thereof, these particular embodiments are merely illustrative, and not restrictive. For example, although specific applications such as video on demand or a personal video recorder have been described, it is possible to adapt features of the invention for other applications. Although operations are described with respect to a "picture," any other collection of data may be similarly used such a group of pictures, a block, macroblock, slice or other picture portion, etc.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of particular embodiments. One skilled in the relevant art will recognize, however, that a particular embodiment can be practiced without one or more of the specific details, or with other apparatus, systems, assemblies, methods, components, materials, parts, and/or the like. In other instances, well-known structures, materials, or operations are not specifically shown or described in detail to avoid obscuring aspects of particular embodiments.

A "computer-readable medium" for purposes of particular embodiments may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory.

Particular embodiments can be implemented in the form of control logic in software or hardware or a combination of both. The control logic, when executed by one or more processors, may be operable to perform that what is described in particular embodiments.

A "processor" or "process" includes any human, hardware and/or software system, mechanism or component that processes data, signals, or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", "a specific embodiment", or "particular embodiment" means that a particular feature, structure, or characteristic described in connection with the particular embodiment is included in at least one embodiment and not necessarily in all particular embodiments. Thus, respective appearances of the phrases "in a particular embodiment", "in an embodiment", or "in a specific embodiment" in various places throughout this specification are not necessarily referring to the same embodiment. Furthermore, the particular features, structures, or characteristics of any specific embodiment may be combined in any suitable manner with one or more other particular embodiments. It is to be understood that other variations and modifications of the particular embodiments described and illustrated herein are possible in light of the teachings herein and are to be considered as part of the spirit and scope.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an" and "the" includes plural references unless the context clearly dictates otherwise. Also, as used in the description herein and throughout the claims that follow, the meaning of "in" includes "in" and "on" unless the context clearly dictates otherwise.

The foregoing description of illustrated particular embodiments, including what is described in the Abstract, is not intended to be exhaustive or to limit the invention to the precise forms disclosed herein. While specific particular embodiments of, and examples for, the invention are described herein for illustrative purposes only, various equivalent modifications are possible within the spirit and scope, as those skilled in the relevant art will recognize and appreciate. As indicated, these modifications may be made to the present invention in light of the foregoing description of illustrated particular embodiments and are to be included within the spirit and scope.

Thus, while the present invention has been described herein with reference to particular embodiments thereof, a latitude of modification, various changes and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit. It is intended that the invention not be limited to the particular terms used in following claims and/or to the particular embodiment disclosed as the best mode contemplated for carrying out this invention, but that the invention will include any and all particular embodiments and equivalents falling within the scope of the appended claims.

We claim:

1. A method for outputting auxiliary information for use in playing back a video sequence, the method comprising:
    obtaining a measure of usefulness of a particular picture for playing back the video sequence, wherein the measure of usefulness indicates a performance of playing back the video sequence if the particular picture is available in a decoded state at a time of playback versus the particular picture not being available in a decoded state at a time of playback;
    determining a position in a data stream that includes the video sequence; and
    storing the auxiliary information at the determined position in the data stream, the auxiliary information corresponding to the measure of usefulness for the particular picture, the auxiliary information further formed from a combination of one or more properties of the particular picture and one or more interdependency characteristics of the particular picture.

2. The method of claim 1, wherein playback occurs from a storage device in a set-top box.

3. The method of claim 2, wherein the measure of usefulness includes an indication of the usefulness of the particular picture during playback at a slower speed than normal.

4. The method of claim 2, wherein the measure of usefulness includes an indication of the usefulness of the particular picture during playback at a higher speed than normal.

5. The method of claim 2, wherein the measure of usefulness includes an indication of the usefulness of the particular picture during playback while skipping frames.

6. The method of claim 2, wherein the measure of usefulness includes an indication of the usefulness of the particular picture during a pause operation.

7. The method of claim 1, wherein the measure of usefulness includes an indication of an output-delay-property.

8. The method of claim 1, wherein the measure of usefulness includes an indication of a complete-information-property.

9. The method of claim 1, wherein the measure of usefulness includes an indication of an importance-level-property.

10. The method of claim 1, wherein the measure of usefulness is only stored during a playback operation that uses a trick play.

11. An apparatus for outputting auxiliary information for use in playing back a video sequence, the apparatus comprising:
    a processor;
    one or more instructions executable by the processor for obtaining a measure of usefulness of a particular picture for playing back the video sequence, wherein the measure of usefulness indicates a performance of playing back the video sequence if the particular picture is available in a decoded state at a time of playback versus the particular picture not being available in a decoded state at a time of playback;
    determining a position in a data stream that includes the video sequence; and
    storing the auxiliary information at the determined position in the data stream, the auxiliary information corresponding to the measure of usefulness for the particular picture, the auxiliary information further formed from a combination of one or more properties of the particular picture and one or more interdependency characteristics of the particular picture.

12. The apparatus of claim 11, wherein the apparatus is included as part of a set-top box.

13. The apparatus of claim 11, wherein the apparatus is included as part of a video encoder.

14. The apparatus of claim 11, wherein the apparatus is included as part of a video decoder.

15. The apparatus of claim 11, wherein the apparatus is included as part of a network device.

16. The apparatus of claim 11, wherein the apparatus is included as part of a display system.

17. A non-transitory memory encoded with one or more instructions executable by a processor for:
    obtaining a measure of usefulness of a particular picture for playing back the video sequence, wherein the measure of usefulness indicates a performance of playing back the video sequence if the particular picture is available in a decoded state at a time of playback versus the particular picture not being available in a decoded state at a time of playback;
    determining a position in a data stream that includes the video sequence; and
    storing the auxiliary information at the determined position in the data stream, the auxiliary information corresponding to the measure of usefulness for the particular picture, the auxiliary information further formed from a combination of one or more properties of the particular picture and one or more interdependency characteristics of the particular picture.

18. A method for splicing from a first video sequence to a second video sequence, wherein each video sequence includes encoded pictures that are decoded into decoded pictures in a decode order, wherein decoded pictures are displayed in a presentation order at picture output times, the method comprising:
    identifying an exit point for the first video sequence, wherein the exit point determines a last frame to display of the first video sequence;
    determining a number of pictures of the first video sequence that are already decoded into a decode picture buffer;
    reading a first data field in the first video sequence to obtain a first value, wherein the value indicates a number of consecutive pictures prior to the exit point; and
    initiating decoding of the second video sequence so that a sufficient number of pictures in the second video sequence are decoded at a time of displaying the last picture from the decode picture buffer so that displaying of pictures in the second video sequence can begin at a next picture output time.

19. The method of claim 18, further comprising:
    reading a second data field in the first video sequence to obtain a second value, wherein the second value indicates a number of decoded pictures in the decoded picture buffer (DPB).

20. The method of claim 19, wherein the second value indicates a number of decoded pictures in the DPB that have successive picture output times.

21. The method of claim 20, wherein a first of the successive output times includes a picture output time immediately after the decompression time of a last consecutive picture prior to the exit point as indicated by the first value.

22. The method of claim 18, wherein the actions are performed at a video splicing device located in a headend of a digital video broadcast system.

23. The method of claim 18, further comprising:
assigning picture output times to the pictures in the picture decode buffer in accordance with an original order of the pictures in the picture decode buffer.

24. The method of claim 23, further comprising:
ensuring that all of the pictures from the first video sequence to be decoded are decoded prior to the exit point.

25. The method of claim 24, further comprising:
decoding a number of pictures from the second video sequence as indicated by the second value, wherein the decoding occurs prior to completion of a transition period.

26. The method of claim 25, further comprising:
setting an earliest picture output time of a picture from the second video sequence to be just after an end of the transition period.

27. The method of claim 18, wherein the first value is larger than the second value.

28. The method of claim 27, wherein the first value is also greater than a predetermined threshold.

29. The method of claim 28, wherein the predetermined threshold is equal to three picture output times.

30. The method of claim 19, wherein the first and second data fields are provided in association with multiple pictures.

31. The method of claim 30, wherein the first and second data fields are provided in association with each of the determined number of pictures of the first video sequence.

32. The method of claim 31, wherein the first data field's value is N for the first picture and decreases by one successively in each successive instance of the first data field in a subsequent picture.

33. The method of claim 18, further comprising:
causing display of a first picture of the second video sequence to be equal to a presentation time stamp of a first picture in the DPB.

34. The method of claim 33, wherein the displayed first picture of the second video sequence includes an instantaneous decoding refresh picture.

35. The method of claim 34, wherein the instantaneous decoding refresh picture includes an I-frame.

36. An apparatus for splicing from a first video sequence to a second video sequence, wherein each video sequence includes encoded pictures that are decoded into decoded pictures in a decode order, wherein decoded pictures are displayed in a presentation order at picture output times, the apparatus comprising:
a processor;
a non-transitory memory encoded with instructions for execution by the processor, including one or more instructions for:
identifying an exit point for the first video sequence, wherein the exit point determines a last frame to display of the first video sequence;
determining a number of pictures of the first video sequence that are already decoded into a decode picture buffer;
reading a first data field in the first video sequence to obtain a first value, wherein the value indicates a number of consecutive pictures prior to the exit point; and
initiating decoding of the second video sequence so that a sufficient number of pictures in the second video sequence are decoded at a time of displaying the last picture from the decode picture buffer so that displaying of pictures in the second video sequence can begin at a next picture output time.

37. The apparatus of claim 36, wherein the memory further includes one or more instructions encoded therein for:
reading a second data field in the first video sequence to obtain a second value, wherein the second value indicates a number of decoded pictures in the decoded picture buffer (DPB).

38. A computer readable medium including one or more instructions encoded therein for splicing from a first video sequence to a second video sequence, wherein each video sequence includes encoded pictures that are decoded into decoded pictures in a decode order, wherein decoded pictures are displayed in a presentation order at picture output times, the memory comprising one or more instructions encoded therein for:
identifying an exit point for the first video sequence, wherein the exit point determines a last frame to display of the first video sequence;
determining a number of pictures of the first video sequence that are already decoded into a decode picture buffer;
reading a first data field in the first video sequence to obtain a first value, wherein the value indicates a number of consecutive pictures prior to the exit point; and
initiating decoding of the second video sequence so that a sufficient number of pictures in the second video sequence are decoded at a time of displaying the last picture from the decode picture buffer so that displaying of pictures in the second video sequence can begin at a next picture output time.

39. The non-transitory computer readable medium of claim 38, further comprising one or more instructions encoded therein for:
reading a second data field in the first video sequence to obtain a second value, wherein the second value indicates a number of decoded pictures in the decoded picture buffer (DPB).

* * * * *